(12) United States Patent
Sato et al.

(10) Patent No.: US 6,965,495 B2
(45) Date of Patent: Nov. 15, 2005

(54) THIN FILM MAGNETIC HEAD AND METHOD OF MANUFACTURING THE SAME

(75) Inventors: Kiyoshi Sato, Niigata-ken (JP); Toshinori Watanabe, Niigata-ken (JP); Toshihiro Kuriyama, Niigta-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 110 days.

(21) Appl. No.: 10/622,045

(22) Filed: Jul. 16, 2003

(65) Prior Publication Data

US 2004/0012884 A1 Jan. 22, 2004

(30) Foreign Application Priority Data

Jul. 17, 2002 (JP) .................................. 2002-208600
Dec. 6, 2002 (JP) .................................. 2002-354476

(51) Int. Cl.[7] .......................... G11B 5/147; G11B 5/17
(52) U.S. Cl. ......................... 360/126; 360/123
(58) Field of Search .............................. 360/126, 123

(56) References Cited

U.S. PATENT DOCUMENTS

| 5,793,578 | A  | * | 8/1998 | Heim et al. ............... 360/126 |
| 6,154,346 | A  | * | 11/2000 | Sasaki |
| 6,191,918 | B1 |   | 2/2001 | Clarke et al. |
| 6,259,583 | B1 | * | 7/2001 | Fontana, Jr. et al. |
| 6,301,085 | B1 |   | 10/2001 | Sato |
| 6,417,990 | B1 | * | 7/2002 | Zhou et al. |
| 6,553,649 | B1 | * | 4/2003 | Santini .................. 360/126 |
| 6,757,134 | B2 | * | 6/2004 | Emilio Santini ........ 360/126 |
| 2001/0010611 | A1 |   | 8/2001 | Yazawa et al. |
| 2001/0013505 | A1 | * | 8/2001 | Sasaki |
| 2001/0040764 | A1 |   | 11/2001 | Kamijima |

FOREIGN PATENT DOCUMENTS

JP   2001-250203    9/2001
JP   2001-319311    11/2001

* cited by examiner

*Primary Examiner*—Robert S. Tupper
(74) *Attorney, Agent, or Firm*—Brinks Hofer Gilson & Lione

(57) ABSTRACT

A thin film magnetic head has coil layer formed in a space surrounded by a lower core layer, a protruding layer and a back gap layer. The top of these layers are planarized to a continuous flat surface. A lower magnetic pole layer, a gap layer, an upper magnetic pole layer and an upper core layer are formed on the flat surface and are precisely formed in a predetermined shape. The track width Tw can also be set to a predetermined dimension by the width of the upper magnetic pole layer at a surface facing the recording medium. Also, the magnetic path can be shortened to improve magnetic properties.

14 Claims, 20 Drawing Sheets

SURFACE
FACING
RECORDING
MEDIUM

THIN FILM MAGNETIC HEAD AND METHOD OF MANUFACTURING THE SAME

This application claims the benefit of priority to Japanese Patent Applications 2002-208600, filed on Jul. 17, 2002 and 2002-354476, filed on Dec. 6, 2002.

BACKGROUND OF THE INVENTION

1. Field of the Invention

The present invention relates to a recording thin film magnetic head used for, for example, a floating magnetic head and the like. Particularly, the present invention relates to a thin film magnetic head which is adaptable to a narrower track, and in which a track width can be precisely formed to a predetermined dimension, a magnetic path can be shortened, and a leakage of a magnetic flux can be suppressed to improve recording characteristics, and a method of manufacturing the thin film magnetic head.

2. Description of the Related Art

FIG. 25 is a longitudinal sectional view showing an example of conventional thin film magnetic heads, in which the leftmost surface shown in parallel to a X-Z surface on the left side of the drawing is a "surface facing a recording medium". In FIG. 25, the X direction coincides with the track width direction, the Y direction coincides with the height direction, and the Z direction coincides with the movement direction of a magnetic recording medium such as a hard disk or the like.

In FIG. 25, reference numeral 1 denotes a lower core layer made of a NiFe alloy, and reference numeral 2 denotes a gap layer made of $Al_2O_3$ or the like and formed on the lower core layer 1. As shown in FIG. 25, a coil layer 3 made of Cu is formed on the gap layer 2 and coated with an organic insulating layer 4 made of resist or the like. Also, an upper core layer 5 made of a NiFe alloy or the like is formed on the organic insulating layer 4, the front end 5a of the upper core layer 5 facing the lower core layer 1 with the gap layer 2 provided therebetween near the surface facing the recording medium, and the base end 5b being formed in direct contact with a rear portion of the lower core layer 1 in the height direction.

FIG. 26 is a longitudinal sectional view of another example of conventional thin film magnetic heads, and FIG. 27 is a front view of the thin film magnetic head shown in FIG. 26. In FIG. 26, the surface shown on the left side of the drawing is a "surface facing a recording medium".

In FIG. 26, reference numeral 6 denotes a lower core layer which contains a protrusion 6a protruding toward an upper core layer (the Z direction shown in the drawing) near the side facing the recording medium. As shown in FIG. 26, a back gap layer 7 made of a magnetic material is formed on a rear portion of the lower core layer 6 in the height direction (the Y direction), and a coil layer 8 is partially disposed between the protrusion 6a and the back gap layer 7. The coil layer 8 is covered with an insulating layer 9, and the top 6b of the protrusion 6a, the top 9a of the insulating layer 9 and the top 7a of the back gap layer 7 are planarized.

As shown in FIG. 26, a gap layer 10 made of $Al_2O_3$ or the like is formed to extend from the top 6b of the protrusion 6a to the top 9a of the insulating layer 9, and a nonmagnetic layer 12 is formed on the gap layer 10 to extend from a position at a predetermined distance from the surface facing the recording medium in the height direction. Furthermore, an upper core layer 11 is formed over the gap layer 10, the nonmagnetic layer 12 and the back gap layer 7.

FIG. 28 is a longitudinal sectional view showing a further example of conventional thin film magnetic heads. In FIG. 28, the surface shown on the left side of the drawing is a "surface facing a recording medium".

In FIG. 28, reference numeral 13 denotes a lower core layer which contains a protrusion 13a protruding toward an upper core layer (the Z direction shown in the drawing) near the surface facing the recording medium. As shown in FIG. 28, a back gap layer 14 made of a magnetic material is formed on a rear portion of the lower core layer 13 in the height direction (the Y direction), and a coil layer 15 is partially disposed between the protrusion 13a and the back gap layer 14. The coil layer 15 is covered with an insulating layer 16, and the top 13b of the protrusion 13a and the top 16a of the insulating layer 16 are planarized. As shown in FIG. 28, a gap layer 18 made of, for example, $Al_2O_3$ is formed on the top 13b of the protrusion 13a and the top 16a of the insulating layer 16 to extend from the surface facing the recording medium to the front end 14a of the back gap layer 14, and the top 18a of the gap layer 18 and the top 14b of the back gap layer 14 are planarized.

Furthermore, an upper core layer 19 is formed over the top 18a of the gap layer 18 and the top 14b of the back gap layer 14.

These thin film magnetic heads are disclosed the following patent documents.

[Patent Document 1]

Japanese Unexamined Patent Application Publication No. 2001-319311

[Patent Document 2]

Japanese Unexamined Patent Application Publication No. 2001-250203

In recent years, decreases in size requirements have resulted in some amount of miniaturization of the thin film magnetic heads. In addition to miniaturization requirements, increases in operating speed requirements coupled with increases in the recording density and frequency (as well as reductions in size) have resulted in more stringent requirements for design structures, material properties, and other characteristics of the thin film magnetic heads.

In the thin film magnetic head, the width dimension and, more specifically, the track width, decreases as the recording density increases. The track width Tw is the width of the front end 5a of the upper core layer 5 at the surface facing the recording medium.

However, when the organic insulating layer 4 formed to cover the coil layer 3 extends from the gap layer 2, as shown in FIG. 25, the resist used for patterning the upper core layer 5 is influenced by irregularities introduced during processing, e.g. irregular reflection during development. Such irregularities appear in conventional thin film magnetic heads. The upper core layer 5 of conventional thin film magnetic heads thus cannot be formed in a predetermined shape, which consequently increases the track width Tw.

In addition, conventional thin film magnetic heads, like that shown in FIG. 25, must have a low thermal expansion coefficient. If a thin film magnetic head has a high thermal expansion coefficient, thermal deformation occurs during driving. In particular, the gap layer 2 or the like projects from the surface facing the recording medium when such thermal deformation occurs. This causes the spacing, i.e. the distance from the surface facing the recording medium (not shown) to the surface of the recording medium, to decrease. While a decrease in spacing in general permits a higher recording density to be realized, it is undesirable in this case as the projection of the gap layer 2 or the like causes collision between the thin film magnetic head and the recording medium during driving.

In addition, the same results can occur if enough of a mismatch exists between the thermal expansion coefficients of the different layers. For example, the thin film magnetic head shown in FIG. 25 contains the organic insulating layer 4 made of resist, for covering the coil layer 3. Since the organic insulating layer 4 has a significantly higher thermal expansion coefficient than the thermal expansion coefficients of the other layers, the organic insulating layer 4 thermally expands during driving of the thin film magnetic head, and thus the gap layer 2 projects toward the recording medium due to the expansion.

In the thin film magnetic head shown in FIG. 25, the magnetic path extending from the upper core layer 5 to the lower core layer 1 is long because the organic insulating layer 4 covers and extends a significant distance from the gap layer 2. Due to the length of the magnetic path, the coil layer 3 must have a certain turn number in order to obtain the necessary flux efficiency. A reduced number of turns decreases the heat generated by a comparable amount and thus expansion of the organic insulating layer 4. However, because the coil resistance in this conventional structure cannot be decreased, the projection remains problematic in such a structure.

In the thin film magnetic head shown in FIG. 26, the coil layer 8 is buried in the space formed by the lower core layer 6, the protrusion 6a and the back gap layer 7, and thus the thickness of a layer (the nonmagnetic layer 12) disposed on the gap layer 10 is smaller than that in the thin film magnetic head shown in FIG. 25, thereby facilitating precise formation of the upper core layer 11 in comparison to the thin film magnetic head shown in FIG. 25. However, the upper core layer 11 is not formed on a completely planarized surface, and thus the upper core layer cannot be precisely formed in a predetermined shape, as above consequently increasing the track width Tw.

The thin film magnetic head shown in FIG. 26 also has the following problem: in order to suppress side fringing, the front side of the thin film magnetic head must be trimmed to the shape shown in FIG. 27. The side fringing is a phenomenon in which the track width is substantially increased by leakage of a magnetic field from both sides. Because of the increase in recording density, side fringing must be prevented as much as possible.

Therefore, as shown in FIG. 27, both side ends 11a of the upper core layer 11, both side ends 10a of the gap layer 10 and both side ends 6c of the protrusion 6a of the lower core layer 6 are trimmed to set the track width Tw to the greatest extent possible.

However, the required track width Tw is as small as about 0.3 $\mu$m or less. This width is, at the least, difficult to reach by trimming. Also, readhesion after trimming decreases precision of the track width Tw, which increases in importance as the track width Tw decreases.

Unlike the thin film magnetic head shown in FIG. 26, in the thin film magnetic head shown in FIG. 28, a nonmagnetic layer is not formed on the gap layer 18. Therefore, the top 18a of the gap layer 18 and the top 14b of the back gap layer 14 can be planarized, and thus the upper core layer 19 can be formed on the planarized surface, thereby facilitating the precise formation of the upper core layer 19 in comparison to the thin film magnetic head shown in FIG. 26.

However, like in the thin film magnetic head shown in FIG. 26, in the thin film magnetic head shown in FIG. 28, both side ends of the upper core layer 19, both side ends of the gap layer 18 and both side ends of the protrusion 13a in the track width direction are trimmed to set the track width Tw. Therefore, as described above with reference to FIG. 27, the track width Tw cannot be easily precisely defined due to readhesion during trimming.

In addition, in the thin film magnetic head shown in FIG. 28, the gap layer 18 is formed from an inorganic insulating material such as $Al_2O_3$. The gap layer 18 must not be formed at a connection between the back gap layer 14 and the upper core layer 19. Therefore, as shown in FIG. 28, the gap layer 18 is absent from the connection between the back gap layer 14 and the upper core layer 19. In manufacturing the structure shown in FIG. 28, a through hole for forming the back gap layer 14 must be formed in the gap layer 18 and the coil insulating layer 16 after the gap layer 18 is formed, and then the back gap layer 14 must be formed in the through hole by plating, complicating the manufacturing process. Particularly, if the through hole does not completely extend from the top 18a of the gap layer 18 to the surface of the lower core layer 13, magnetic connection between the lower core layer 13 and the back gap layer 14 deteriorates, thereby deteriorating the recording properties. However, as the coil insulating layer 16 is relatively thick, it is difficult to form a through hole that completely passes through the coil insulating layer 16.

As described above, the thin film magnetic heads shown in FIGS. 25, 26 and 28 are limited in both recording density and frequency. Thus, thin film magnetic heads having a higher recording density and higher frequency cannot be provided in the future, and the recording properties of the thin film magnetic heads cannot be improved.

SUMMARY OF THE INVENTION

Accordingly, one object of the present invention is to solve the problems of conventional magnetic heads. Objects of the present invention thus include providing a thin film magnetic head which is adaptable for a narrower track, precisely forming the track width, shortening the magnetic path, and improving the recording properties.

Another object of the present invention is to provide a thin film magnetic head that is easily manufacturable as well as a method of manufacturing the thin film magnetic head in a small number of steps.

To at least these ends, in one embodiment, the thin film magnetic head comprises a lower core layer extending from a surface facing a recording medium in a height direction, a protruding layer extending on the lower core layer for a predetermined length from the surface facing the recording medium in the height direction, a back gap layer disposed on the lower core layer at a first distance from the rear end of the protruding layer in the height direction, a coil layer disposed in a space surrounded by at least the lower core layer, the protruding layer and the back gap layer, and a coil insulating layer covering the coil layer. The top of the protruding layer, the top of the coil insulating layer and the top of the back gap layer are planarized to a continuous flat surface.

A Gd-determining layer is further formed on the flat surface at a second distance from the surface facing the recording medium in the height direction.

Also, a lower magnetic pole layer and gap layer are formed on the flat surface in that order from below in each of a region between the Gd-determining layer and the surface facing the recording medium and a region behind the Gd-determining layer in the height direction, and an upper magnetic pole layer is formed over the gap layer and the Gd-determining layer.

The lower magnetic pole layer, the gap layer and the upper magnetic pole layer have the same planar shape, and a track width Tw is determined by the width dimension (or width) of the upper magnetic pole layer in the track width direction at the surface facing the recording medium.

The various layers have a front end surface that is positioned more proximate to the surface facing the recording medium than a rear end surface.

The thin film magnetic head is characterized in that the coil layer is formed in the space surrounded by the lower core layer, the protruding layer and the back gap layer, the top of the protruding layer, the top of the coil insulating layer and the top of the back gap layer are planarized to a continuous flat surface, and the three layers including the lower magnetic pole layer, the gap layer and the upper magnetic pole layer are formed on the flat surface.

Since the lower magnetic pole layer, the gap layer and the upper magnetic pole layer can be formed on the flat surface, these three layers can be precisely formed in a predetermined shape, and the track width Tw can be easily set to a predetermined dimension by the width of the upper magnetic pole layer at the surface facing the recording medium. It is thus possible to manufacture a thin film magnetic head appropriately adaptable to a higher recording density.

Since the lower magnetic pole layer, the gap layer and the upper magnetic pole layer can be formed on the flat surface, the magnetic path can be shortened. Therefore, even with a small number of coil turns, deterioration of the recording property can be prevented. Thus, the number of coil turns can be decreased to decrease the coil resistance, and the problem of projection due to thermal expansion can be properly suppressed.

Also, unlike the thin film magnetic head shown in FIG. 25, the present thin film magnetic head does not require an organic insulating layer, and thus the thermal expansion coefficient can be decreased to appropriately suppress the problem of projection due to thermal expansion.

The Gd-determining layer is provided on the flat surface, and functionally separates the lower magnetic pole layer and upper magnetic pole layer into a magnetic pole and a yoke. Namely, at least a portion of each of the lower magnetic pole layer and upper magnetic pole layer, which is ahead of the Gd-determining layer, functions as the magnetic pole that concentrates the magnetic flux to generate a recording magnetic field for the recording medium, and at least a portion behind the Gd-determining layer functions as the yoke that permits a magnetic flux to flow effectively in the closed magnetic path. The magnetic pole and the yoke are integrally formed, but may be appropriately separated by providing the Gd-determining layer.

The lower magnetic pole layer, the gap layer and the upper magnetic pole layer are preferably formed by plating, which permits a narrower track to be realized without the use of conventional trimming.

Preferably, the upper core layer is formed on the upper magnetic pole layer into the same planar shape as the upper magnetic pole layer, and the upper magnetic pole layer and lower magnetic pole layer have a higher saturation magnetic flux density than that of the upper core layer. The upper core layer can be formed directly on the upper magnetic pole layer. Since the surface of the upper magnetic pole layer is substantially planarized, the surface of the upper core layer can also be formed on the planarized surface to permit high-precision formation of the upper core layer in a predetermined shape, as compared with a conventional magnetic head. When each of the upper magnetic pole layer and lower magnetic pole layer is formed by using a magnetic material having a higher saturation magnetic flux density that that of the upper core layer, the magnetic flux efficiency can be improved to improve the recording property.

The upper core layer preferably has a larger thickness than that of the upper magnetic pole layer. The upper magnetic pole layer and lower magnetic pole layer preferably have a higher saturation magnetic flux density than those of the lower core layer, the protruding layer and the back gap layer.

The upper magnetic pole layer preferably has a planar shape comprising a front end portion which has a width corresponding to the track width at the surface facing the recording medium and which extends in the height direction while the width remains constant or widens so that the width increases. The upper magnetic pole layer also has a rear end portion which widens from the base end of the front end portion in the track width direction so that the width increases in the height direction. The upper magnetic pole layer having this planar shape can concentrate the magnetic flux in the front end portion serving as the magnetic pole, and increase the magnetic flux efficiency in the rear end portion serving as the yoke.

The boundary between the bottom and the front end surface of the Gd-determining layer is positioned on the protruding layer. The Gd-determining layer is formed from the protruding layer to the coil insulating layer.

The length in the height direction from the boundary between the top and the rear end surface of the protruding layer in the height direction to the boundary between the bottom and the rear end surface of the Gd-determining layer in the height direction is preferably larger than the maximum thickness of the Gd-determining layer.

This construction can suppress leakage of a recording magnetic field from the vicinity of the rear end surface of the Gd-determining layer in the height direction without passing through the conventional route.

Also, the boundary between the bottom and the rear end surface of the Gd-determining layer is preferably positioned on the back gap layer or on the boundary between the top and the front end surface of the back gap layer. The Gd-determining layer is preferably disposed between the top of the coil insulating layer and the bottom of the upper magnetic pole layer. Consequently, it is possible to effectively suppress leakage from the vicinity of the rear end surface of the Gd-determining layer in the height direction and increase the thickness of the coil layer, thereby decreasing the coil resistance.

A first plated underlying layer is preferably provided on at least a portion of the flat surface between the rear end surface of the Gd-determining layer and the front end surface of the back gap layer. The lower magnetic pole layer is preferably formed on the first plated underlying layer by plating. In this case, the first plated underlying layer can be formed using a nonmagnetic metal material. A second plated underlying layer is preferably formed on the protruding layer and separated from the first plated underlying layer so that at least the Gd-determining layer is positioned between the first and second plated underlying layers. The second plated underlying layer preferably comprises a magnetic material, and the lower magnetic pole layer is preferably formed on the second plated underlying layer by plating. The second plated underlying layer is also provided on the protruding layer, and the front end of the second plated underlying layer is exposed at the surface facing the recording medium. Therefore, the second plated underlying layer must comprise a magnetic material because if the second plated underlying layer comprises a nonmagnetic metal material, the second plated underlying layer functions as a pseudo-gap.

A third plated underlying layer is partially formed on the Gd-determining layer, and the upper magnetic pole layer is preferably formed on the third plated underlying layer by plating. In this case, the upper magnetic pole layer can easily be formed in a predetermined shape on the Gd-determining layer.

The coil layer may be formed on a plane parallel to the surface of the lower core layer into a shape in which it is wound around the back gap layer as a center, or the coil layer may comprise a plurality of first coil segments formed in parallel to each other in the space surrounded by the lower core layer, the protruding layer and the back gap layer, and a plurality of second coil segments formed in parallel to each other on the upper magnetic pole layer with an insulating layer provided therebetween, the first coil segments being non-parallel to the second coil segments.

Furthermore, an end of each first coil segment and an end of each second coil segments face each other in the thickness direction of the upper magnetic pole layer and are connected to each other through a connecting part in the thickness direction to form a toroidal coil structure.

A method of manufacturing a thin film magnetic head of the present invention comprises the following:

(a) forming a lower core layer such that it extends from a surface facing a recording medium in the height direction;

(b) forming a coil insulating underlying layer on the lower coil layer, and forming a coil layer on the coil insulating underlying layer within a predetermined region;

(c) forming a protruding layer on the lower core layer before or after (b) so that the protruding layer extends from the surface facing the recording medium in a height direction and is out of contact with the front end surface of the coil layer near the surface facing the recording medium, and forming a back gap layer on the lower core layer separated from the rear end surface of the protruding layer in the height direction so that the back gap layer is out of contact with the coil layer;

(d) covering the coil layer with a coil insulating layer so that the top of the protruding layer, the top of the insulating layer and the top of the back gap layer are formed in a continuous flat surface;

(e) forming a Gd-determining layer on the flat surface at a predetermined distance from the surface facing the recording medium; and (f) forming a lower magnetic pole layer and a gap layer on the flat surface in each of a region ahead of the Gd-determining layer near the surface facing the recording medium and a rear region behind the Gd-determining layer in the height direction, and further forming an upper magnetic pole layer over the gap layer and the Gd-determining layer.

In the method of manufacturing the thin film magnetic head, the coil layer is buried between the protruding layer and the back gap layer formed on the lower core layer, and a three-layer structure comprising the lower magnetic pole layer, the gap layer and the upper magnetic pole layer can easily be formed on the planarized surface including the top of the producing layer, the top of the insulating layer and the top of the back gap layer. Since the three-layer structure can be formed on the planarized surface, the three-layer structure can be precisely formed in a predetermined shape to manufacture a thin film magnetic head appropriately adaptable for a higher recording density.

The lower magnetic pole layer, the gap layer and the upper magnetic pole layer are preferably continuously formed by plating in (f). Thus, these three layers can easily be formed in a predetermined shape, and particularly, the track width (which is determined by the width of the upper magnetic pole layer at the surface facing the recording medium) can be precisely regulated.

The upper core layer is preferably continuously formed on the upper magnetic pole layer by plating after (f), and each of the upper magnetic pole layer and lower magnetic pole layer is preferably formed by using a material having a higher saturation magnetic flux density than that of the upper core layer in (f).

In (f), each of the upper magnetic pole layer and lower magnetic pole layer is preferably formed by using a material having a higher saturation magnetic flux density than those of the upper core layer, the protruding layer and the back gap layer.

The lower magnetic pole layer, the gap layer and the upper magnetic pole layer are provided on the planarized surface, and the upper core layer is further provided on these three layers. Therefore, the material of each of the layers can be selected from a wide range, and a material having a higher saturation magnetic flux density can be selected for the lower magnetic pole layer and the upper magnetic pole layer each of which functions as a magnetic pole at the surface facing the recording medium. Furthermore, the lower magnetic pole layer and the upper magnetic pole layer are also provided in the region behind the Gd-determining layer in the height direction so as to function as the yoke in this region. However, the yoke comprises a layer having a high saturation magnetic flux density, and thus a thin film magnetic head having excellent magnetic flux efficiency can be manufactured.

In (f), the upper magnetic pole layer is preferably formed in a planar shape comprising a front end portion which has a width corresponding to the track width at the surface facing the recording medium and which extends while the width remains constant or widens so that the track width increases in the height direction, and a rear end portion which widens from the base end of the front end portion in the track width direction so that the width increases in the height direction. The lower magnetic pole layer, the gap layer and the upper core layer are preferably formed in the same planar shape as that of the upper magnetic pole layer.

In (e), the Gd-determining layer is preferably formed from the protruding layer to the coil insulating layer so that the boundary between the bottom and the front end surface of the Gd-determining layer is positioned on the protruding layer, and the length in the height direction from the boundary between the top and the rear end surface of the protruding layer in the height direction to the boundary between the bottom and the rear end surface of the Gd-determining layer in the height direction is larger than the maximum thickness of the Gd-determining layer.

Also, the Gd-determining layer is preferably formed from the protruding layer to the coil insulating layer or from the protruding layer to the coil insulating layer and the back gap layer so that the boundary between the bottom and the rear end surface of the Gd-determining layer is positioned on the back gap layer or on the boundary between the top and the front end surface of the back gap layer, which is positioned near the surface facing the recording medium, and the Gd-determining layer is disposed between the top of the coil insulating layer and the bottom of the upper magnetic pole layer.

Between (d) and (e), a first plated underlying layer is preferably formed on at least a portion of the flat surface between the rear end surface of the Gd-determining layer in the height direction and the front end surface of the back gap layer, which is positioned near the surface facing the recording medium in the height direction, and the lower magnetic pole layer is preferably formed on the first plated underlying layer by plating. In this case, the first plated underlying layer may be made of a nonmagnetic metal material.

A second plated underlying layer is preferably formed on the protruding layer separately from the first plated underlying layer so that at least the Gd-determining layer is disposed between the first and second plated underlying layers. The second plated underlying layer preferably comprises a magnetic material, and the lower magnetic pole layer is preferably formed on the second plated underlying layer.

A third plated underlying layer is preferably formed on only a portion of the Gd-determining layer, and the upper magnetic pole layer is preferably formed on the third plated underlying layer by plating.

Furthermore, the coil layer may be formed on a plane parallel to the surface of the lower core layer into a shape in which it is wound around the back gap layer as a center, or the coil layer may comprise a plurality of first coil segments formed in parallel to each other in the space surrounded by the lower core layer, the protruding layer and the back gap layer, and a plurality of second coil segments formed in parallel to each other on the upper magnetic pole layer with an insulating layer provided therebetween, the first coil segments being non-parallel to the second coil segments.

Furthermore, an end of each first coil segments and an end of each second coil segments face each other in the thickness direction of the upper magnetic pole layer and are connected to each other through a connecting part in the thickness direction to form a toroidal coil structure.

DESCRIPTION OF THE PREFERRED EMBODIMENTS

Figure 1:
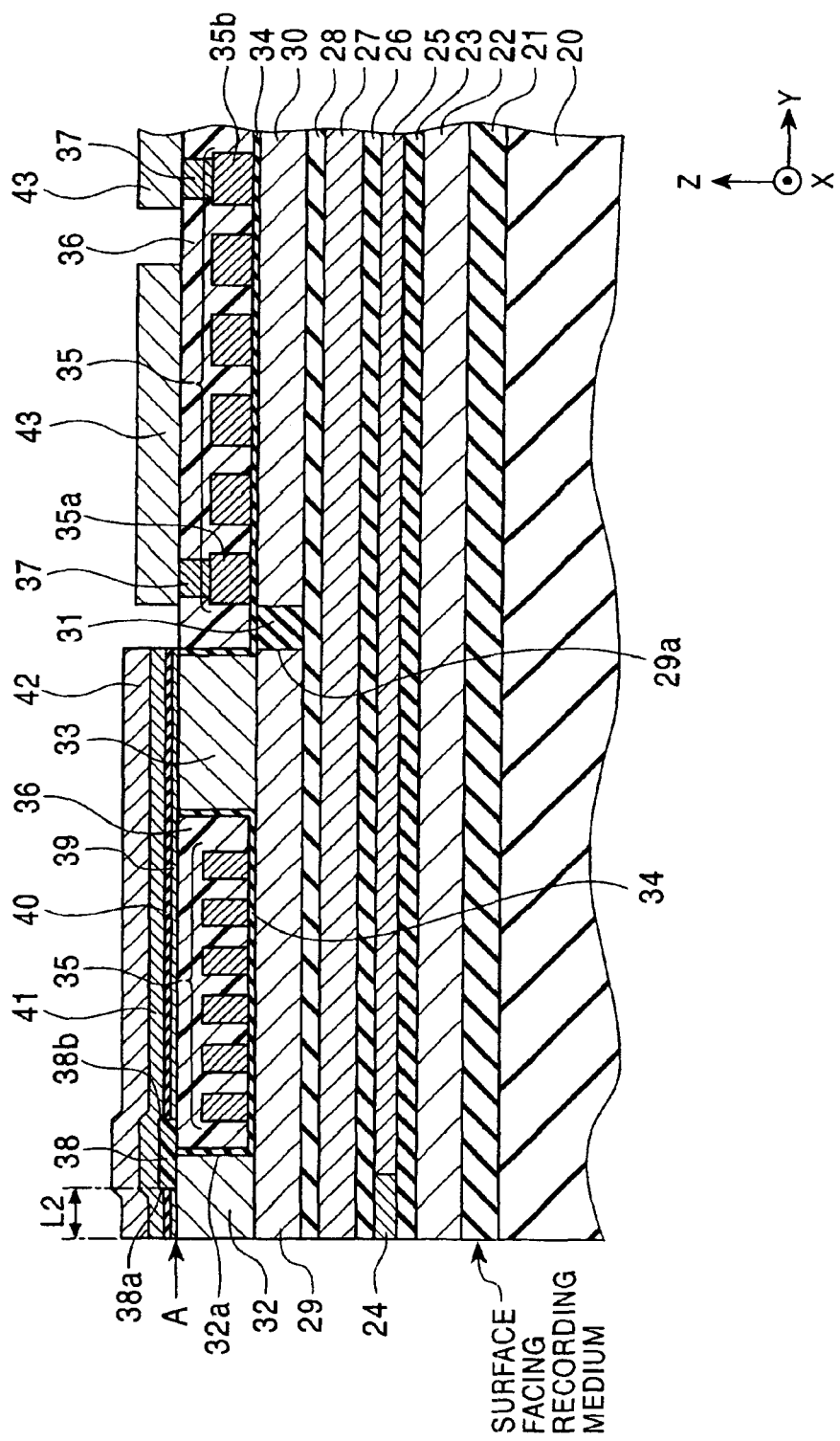
FIG. 1 is a longitudinal sectional view showing a structure of a thin film magnetic head according to a first embodiment of the present invention.
Figure 2:
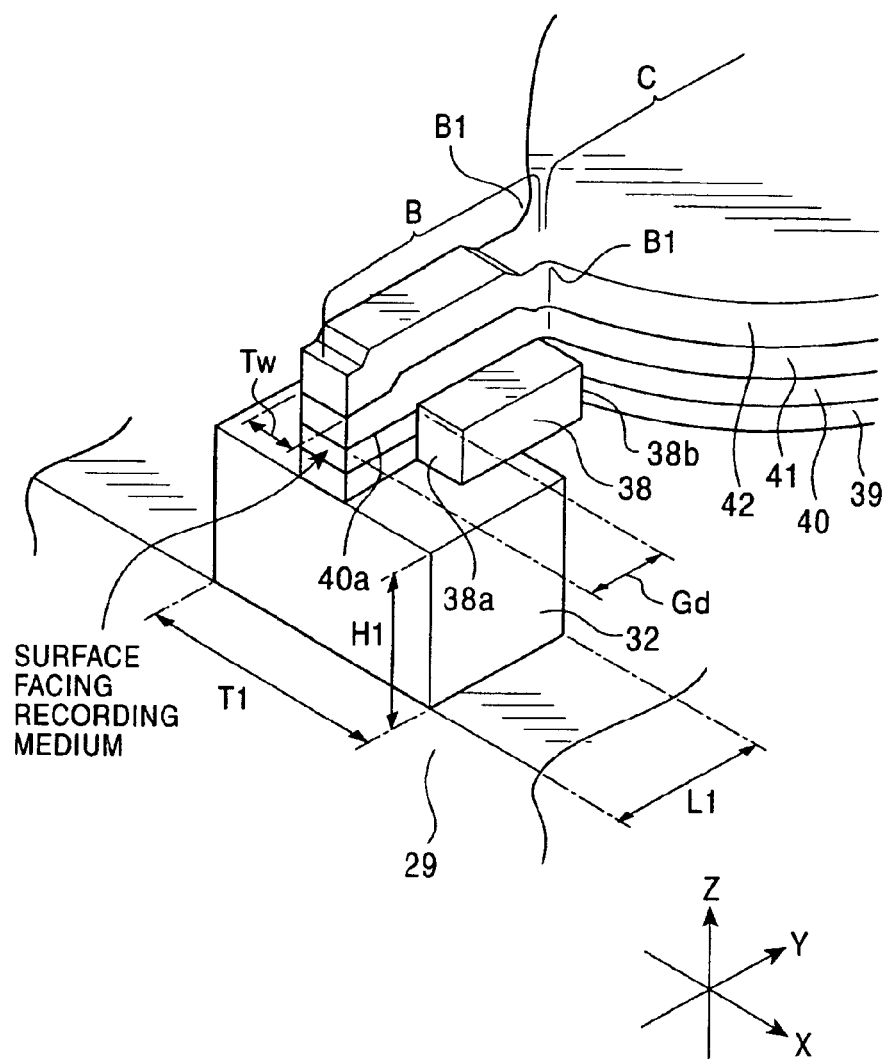
FIG. 2 is a partial perspective view of the thin film magnetic head shown in FIG. 1.
Figure 3:
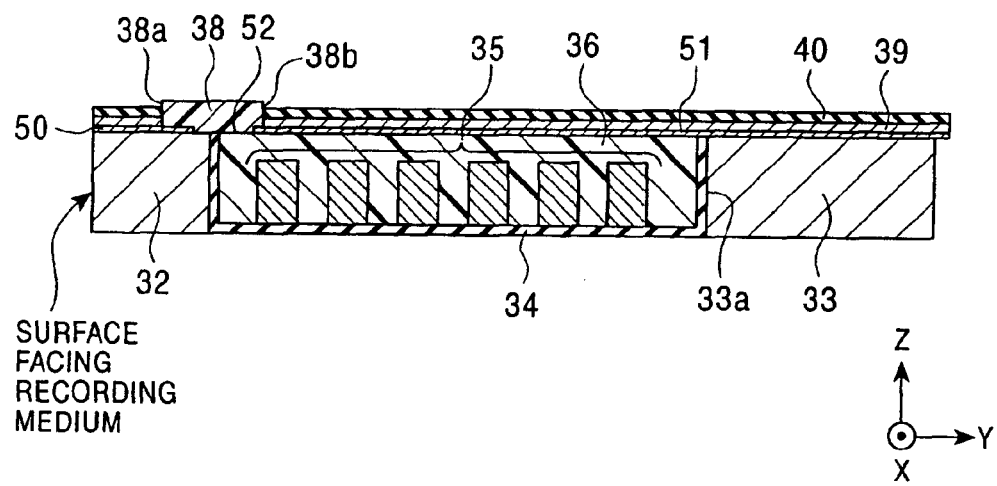
FIG. 3 is an enlarged longitudinal partial sectional view of the thin film magnetic head shown in FIG. 1.
Figure 4:
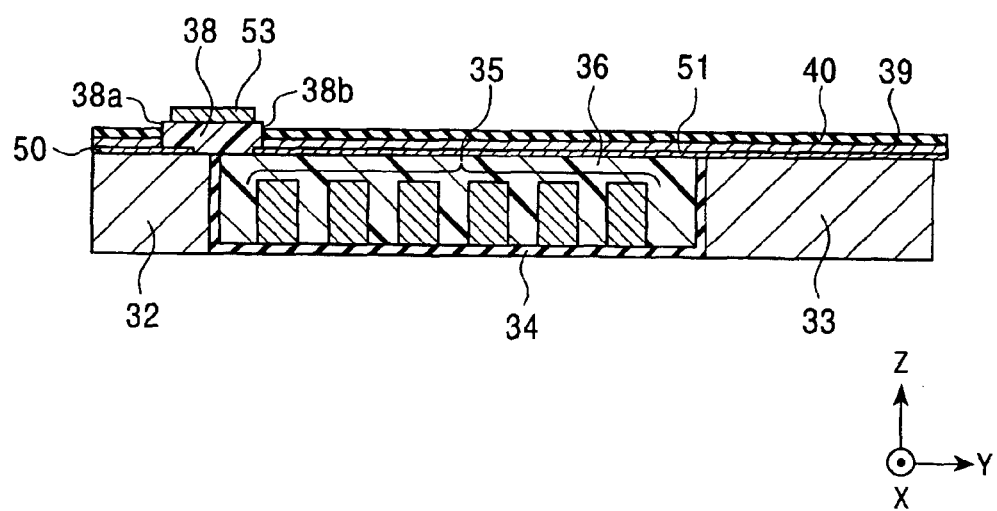
FIG. 4 is an enlarged longitudinal partial sectional view of the thin film magnetic head shown in FIG. 1.

FIG. 1 is a longitudinal partial sectional view showing a structure of a thin film magnetic head according to a first embodiment of the present invention, FIG. 2 is an enlarged partial perspective view showing a portion of the structure of the thin film magnetic head shown in FIG. 1, and FIGS. 3 and 4 are longitudinal partial sectional views each showing the pattern of a plated underlying layer of the thin film magnetic head shown in FIG. 1.

Hereinafter, the X direction is referred to as the "track width direction", and the Y direction is referred to as the "height direction". The Z direction coincides with the movement direction of a recording medium (magnetic disk). Also, the front end surface (the leftmost surface in each drawing) of the thin film magnetic head is referred to as the "surface facing a recording medium".

In the drawings, reference numeral 20 denotes a substrate comprising alumina-titanium carbide ($Al_2O_3$—TiC), an $Al_2O_3$ layer 21 being formed on the substrate 20.

Also, a lower shield layer 22 composed of a NiFe alloy, sendust, or the like is formed on the $Al_2O_3$ layer 21, and a lower gap layer 23 composed of $Al_2O_3$ or the like is formed on the lower shield layer 22.

Furthermore, a magnetoresistive element 24, for example, a GMR element such as a spin-valve thin film element, is formed on the lower gap layer 23 near the surface facing the recording medium, an electrode layer 25 is formed on both sides of the magnetoresistive element 24 in the track width direction (the X direction) to extend in the height direction (the Y direction).

Furthermore, an upper gap layer 26 composed of $Al_2O_3$ or the like is formed over the magnetoresistive element 24 and the electrode layer 25, and an upper shield layer 27 composed of a NiFe alloy or the like is formed over the upper gap layer 26.

The portion ranging from the lower shield layer 22 to the upper shield layer 27 is referred to as a "reproducing head" (MR head).

As shown in FIG. 1, a separating layer 28 comprised of $Al_2O_3$ is formed on the upper shield layer 27. The upper shield layer 27 and the separating layer 28 are not necessarily provided, and a lower core layer 29 may be provided on the upper gap layer 26. In this case, the lower core layer 29 also functions as an upper shield layer.

The lower core layer 29 is formed on the separating layer 28, and comprises a magnetic material such as a NiFe alloy or the like. The lower core layer 29 is formed with a predetermined length dimension (or length) from the surface facing the recording medium in the height direction (the Y direction). A lift layer 30 having a surface at the same height as the surface of the lower core layer 29 is formed at a predetermined distance apart from the base end surface 29a of the lower core layer 29. The space between the lower core layer 29 and the lift layer 30 is filled with a nonmagnetic material layer 31 composed of $Al_2O_3$ or the like. The surfaces of the lower core layer 29, the lift layer 30 and the nonmagnetic material layer 31 are planarized to a continuous flat surface.

Furthermore, a protruding layer 32 is formed on the lower core layer 29 to extend for a predetermined length dimension L1 (refer to FIG. 2) from the surface facing the recording medium in the height direction (the Y direction). Furthermore, a back gap layer 33 is formed on the lower core layer 29 at a predetermined distance apart from the rear end surface 32a of the protruding layer 32 in the height direction (the Y direction).

Each of the protruding layer 32 and the back gap layer 33 comprises a magnetic material which may be the same as or different from the material for the lower core layer 29. Each of the protruding layer 32 and the back gap layer 33 may comprise a single-layer (for simplicity in fabrication, for example) or multi-layer structure (to improve material or structural characteristics during processing or operation, for example). The protruding layer 32 and the back gap layer 33 are magnetically connected to the lower core layer 29.

As shown in FIG. 1, a coil insulating underlying layer 34 comprising an insulating material such as $Al_2O_3$, $SiO_2$, or the like is formed over the lower core layer 29 and the lift layer 30, and a coil layer 35 is formed on the coil insulating underlying layer 34 so as to be wound around the back gap layer 33 as a center.

As shown in FIG. 1, the conductors of the coil layer 35 formed between the back gap layer 33 and the surface facing the recording medium are formed in the space surrounded by the lower core layer 29, the protruding layer 32 and the back gap layer 33.

The coil layer 35 is covered with a coil insulating layer composed of $Al_2O_3$ or the like. As shown in FIG. 1, a bottom-raising layer 37 is formed on each of the coil center 35a and the coil end 35b of the coil layer 35. The bottom-raising layer 37 comprises, for example, the same magnetic material as the protruding layer 32 and the back gap layer 33.

As shown in FIG. 1, the top of the protruding layer 32, the top of the coil insulating layer 36 and the top of the bottom-raising layer 37 are planarized to a continuous flat surface i.e. along the reference plane A shown in FIG. 1.

As shown in FIG. 1, a Gd-determining layer 38 is formed on the flat surface at a minimum distance L2 apart from the surface facing the recording medium in the height direction (the Y direction).

In the embodiment shown in FIG. 1, the front end surface 38a of the Gd-determining layer 38 is positioned on the protruding layer 32, and the rear end surface 38b of the Gd-determining layer 38 is positioned on the coil insulating layer 36.

As shown in FIG. 1, a lower magnetic pole layer 39 and a gap layer 40 are formed, in order from below, on the protruding layer 32 in a region between the surface facing the recording medium and the front end surface 38a of the Gd-determining layer 38, and on the coil insulating layer 36 and the back gap layer 33 in a region behind the rear end surface 38b of the Gd-determining layer 38 in the height direction. In this embodiment, the lower magnetic pole layer 39 and the gap layer 40 are formed by plating.

As shown in FIG. 1, an upper magnetic pole layer 41 is formed over the gap layer 40 and the Gd-determining layer 38 by plating, and an upper core layer 42 is further formed on the upper magnetic pole layer 41 by plating.

In FIG. 1, an extension portion 43 is formed on the bottom-raising layer 37 exposed from the reference plane A.

The characteristic portions of the thin film magnetic head shown in FIG. 1 will be described below.

In FIG. 1, the protruding layer 32 is formed on the lower core layer 29 near the surface facing the recording medium, and the back gap layer 33 is formed on a rear portion of the lower core layer 29 in the height direction. Also, the coil layer 35 is buried in the space surrounded by the lower core layer 29, the protruding layer 32, and the back gap layer 33. The top of the protruding layer 32, the top of the coil insulating layer 36 and the top of the back gap layer 33 are planarized to a continuous flat surface along the reference plane A. Furthermore, the four layers including the lower magnetic pole layer 39, the gap layer 40, the upper magnetic pole layer 41, and the upper core layer 42 are formed on the flat surface by plating.

Since the four layers can be formed on the flat surface, the four layers can be precisely formed in a predetermined shape. Particularly, the width of the upper magnetic pole layer 41 in the track width direction (the X direction) at the surface facing the recording medium is defined as the track width Tw, and thus the track width Tw can be precisely defined to a predetermined dimension because the upper magnetic pole layer 41 can be formed on the flat surface. In this embodiment, the track width Tw can be defined in the range of 0.1 μm to 0.3 μm.

Since the top of the protruding layer 32 and the top of the back gap layer 33 are connected to each other by the four linear layers to form a magnetic path, the magnetic path can be shortened in comparison to a conventional magnetic path formed by a swelling layer formed below the upper core layer 42.

Therefore, even when the turn number (number of turns) of the coil layer 35 of the thin film magnetic head is decreased, the recording properties can be maintained constant. Since the turn number can be decreased for decreasing the coil resistance, heat generation of the thin film magnetic head can be suppressed during driving, thereby suppressing projection of the gap layer 40 from the surface facing the recording medium.

In addition, since the magnetic path can be shortened, the rate of magnetic field reversal can be increased to form a thin film magnetic head exhibiting excellent high-frequency performance.

Unlike conventional magnetic heads, the thin film magnetic head shown in FIG. 1 need not use an organic insulating material such as resist or the like for forming the coil insulating layer 36 to cover the coil layer 35. In other words, an inorganic insulating material can be used and the thermal expansion coefficient of the thin film magnetic head can be decreased.

In the thin film magnetic head shown in FIG. 1, the Gd-determining layer 38 is formed on the flat surface to extend from the protruding layer 32 to the coil insulating layer 36, so that the lower magnetic pole layer 39, the gap layer 40 and the upper magnetic pole layer 41 function as magnetic pole layers in the region between the surface facing the magnetic medium and at least the front end surface 38a of the Gd-determining layer 38, and function as yoke layers in the region behind the Gd-determining layer 38 in the height direction.

Although the lower magnetic pole layer 39, the gap layer 40 and the upper magnetic pole layer 41 are formed to extend from the protruding layer 32 to the back gap layer 33, each of the lower magnetic pole layer 39, the gap layer 40 and the upper magnetic pole layer 41 is divided by the Gd-determining layer 38 so as to function as different layers in the regions ahead of and behind the Gd-determining layers 38, thereby improving the recording properties of the thin film magnetic head.

In the embodiment shown in FIG. 1, all of the four layers including the lower magnetic pole layer 39, the gap layer 40, the upper magnetic pole layer 41 and the upper core layer 42 are formed by plating, and thus the four layers can be formed by plating using the same frame to facilitate the formation. Also, since the four layers are formed by plating, the track width Tw determined by the width dimension of the upper magnetic pole layer 41 at the surface facing the recording medium can be precisely defined to a predetermined dimension. This eliminates the need for trimming in order to decrease the track width Tw, as required in the conventional magnetic head.

Since the four layers are formed by plating using the same frame, the four layers can be formed in the same planar shape.

FIG. 2 is a perspective view showing an example of the structure of the four layers. In FIG. 2, the lower magnetic pole layer 39, the gap layer 40, the upper magnetic pole layer 41 and the upper core layer 42 are formed in a planar shape comprising a front end portion B which has a constant width dimension (or width) at the surface facing in the track width direction (the X direction) and extends while maintaining the width dimension in the height direction (the Y direction), and a rear end portion C which widens from the base end B1 of the front end portion B in the track width direction so that the width gradually increases in the height direction (the Y direction). As described above, the track width Tw is defined by the width dimension of the upper magnetic pole layer 41 in the track width direction (the X direction) at the surface facing the recording medium.

The front end portion B may be formed in a shape in which the width dimension in the track width direction gradually increases from the surface facing the recording medium in the height direction. In this case, the width dimension in the track width direction further increases from the base end B1 of the front end portion B in the height direction to form the rear end portion C.

With respect to the positional relation between the base end B1 of the front end portion B and the Gd-determining layer 38, FIG. 1 shows a case in which the base end B1 of the front end portion B is behind the rear end surface 38b of the Gd-determining layer 38 in the height direction. However, the base end B1 may be positioned on the Gd-determining layer 38.

As shown in FIG. 2, the gap depth (Gd) is determined by the length of the top of the gap layer 40 from the surface facing the recording medium to the front end surface 38a of the Gd-determining layer 38 in the height direction (the Y direction). Therefore, as shown in FIG. 2, in order to appropriately define the gap depth, the gap layer 40 is preferably divided into the portion between the front end surface 38a of the Gd-determining layer 38 and the surface facing the recording medium, and the portion behind the rear end surface 38b of the Gd-determining layer 38 in the height direction. The front end surface 38a of the Gd-determining layer 38 is preferably at a minimum distance L2 (refer to FIG. 1) of about 0.5 $\mu$m to 2.0 $\mu$m from the surface facing the recording medium in the height direction (the Y direction). The gap depth (Gd) is preferably about 0.5 $\mu$m to 2.0 $\mu$m.

Although the Gd-determining layer 38 shown in FIG. 2 is rectangular, it may be formed in a shape having a semi-elliptic longitudinal section. Also, the Gd-determining layer 38 may comprise an organic material such as resist or the like, or an inorganic material. When the Gd-determining layer 38 comprises resist or the like, the surface of the Gd-determining layer 38 is rounded by heat.

Next, the materials of the lower magnetic pole layer 39 and upper magnetic pole layer 41 will be described below. Each of the lower magnetic pole layer 39 and upper magnetic pole layer 41 preferably has a higher saturation magnetic flux density Bs than those of the upper core layer 42, the lower core layer 29, the protruding layer 32 and the back gap layer 33. Since each of the lower magnetic pole layer 39 and upper magnetic pole layer 41, which face the gap layer 40, has a higher saturation magnetic flux density, a recording magnetic field can be concentrated near the gap to improve the recording density.

As shown in FIG. 1, the lower magnetic pole layer 39 and upper magnetic pole layer 41 extend from the rear end of the Gd-determining layer 38 in the height direction (the Y direction), and thus a region having a high saturation magnetic flux density Bs can be provided near the top of the coil layer 35. Therefore, the magnetic flux efficiency can be improved to form a thin film magnetic head having excellent recording properties.

A magnetic material such as a NiFe alloy, a CoFe alloy, a CoFeNi alloy, or the like can be used for the lower magnetic pole layer 39 and the upper magnetic pole layer 41, and a high saturation magnetic flux density Bs can be achieved by controlling the composition ratio of the magnetic material. In this embodiment, the high saturation magnetic flux density Bs is 1.8 T or more.

The lower magnetic pole layer 39 and the upper magnetic pole layer 41 may be formed in a single-layer structure or multi-layer structure for similar reasons as provided above.

The gap layer 40 shown in FIG. 1 comprises a nonmagnetic metal material, and is formed on the lower magnetic pole layer 39 by plating. The nonmagnetic metal layer is preferably selected from at least one of the following: NiP, NiPd, NiW, NiMo, NiRh, Au, Pt, Rh, Pd, Ru, and Cr. The gap layer 40 may be formed in a single-layer structure or multi-layer structure for similar reasons as provided above.

When the gap layer 40 comprises a NiP alloy, continuous plating of the gap layer 40 is performed relatively easily, in addition to the gap layer 40 having excellent heat resistance and high adhesion to the lower magnetic pole layer 39 and the upper magnetic pole layer 41 in the manufacturing process. Also, the hardness of the gap layer 40 can be set to the same as the lower magnetic pole layer 39 and the upper magnetic pole layer 41. Therefore, in processing the surface facing the recording medium, the lower magnetic pole layer 39, the gap layer 40 and the upper magnetic pole layer 41 can be processed by an equal amount by, for example, ion milling to improve processability.

The gap layer 40 preferably comprises a NiP alloy containing 8% by mass to 15% by mass of element P. The gap layer 40 is thus stably non-magnetic with an external factor, for example, generated heat or the like. The alloy composition of the gap layer comprising the NiP alloy can be measured by an X-ray analyzer, a wave dispersive linear analyzer, or the like in combination with SEM, TEM or the like.

Next, the upper core layer 42 will be described. The upper core layer 42 is also formed in the same planar shape as the lower magnetic pole layer 39, the gap layer 40 and the upper magnetic pole layer 41 by plating together with these layers. In the embodiment shown in FIG. 1, the upper core layer 42 can be formed on the substantially flat upper surface of the upper magnetic pole layer 41, and thus the upper core layer 42 can easily be formed in the predetermined shape with high precision, as compared with a conventional magnetic head.

The upper core layer 42 comprises the same magnetic material as that of the lower core layer 29, and the like, and may be formed in a single-layer or multi-layer structure.

Although it is preferable to form the upper core layer 42, it is not necessarily to form this layer. The reason for this is that a layer having a high saturation magnetic flux density, such as the upper magnetic pole layer 41, the lower magnetic pole layer 39 or the like, has a low rate of plating growth and is thus not easily grown to a large thickness. On the other hand, the upper core layer 42 does not require such a high saturation magnetic flux density as required of the upper magnetic pole layer 41 and the lower magnetic pole layer 39, and may have a low magnetic flux density. This means that the upper core layer 42 can be formed to a large thickness under soft plating conditions. Therefore, the recording properties can be improved by providing the upper core layer 42.

The thickness of the upper core layer 42 is about 1 μm to 3 μm. The thickness of the lower magnetic pole layer 39 is about 0.1 μm to 0.5 μm, the thickness of the gap layer 40 is about 0.05 μm to 0.15 μm, and the thickness of the upper magnetic pole layer 41 is about 0.1 μm to 1 μm.

Next, the protruding layer 32 will be described. In the embodiment shown in FIG. 1, the protruding layer 32 is formed separately from the lower core layer 29 and is magnetically connected to the lower core layer 29. The protruding layer 32 may be formed integrally with the lower core layer 29. The protruding layer 32 may comprise the same material as or a different material from the lower core layer 29 and may be formed in a single-layer or multi-layer laminated structure for the same reasons as those above.

As shown in FIG. 2, the width dimension T1 of the protruding layer 32 in the track width direction (the X direction shown in the drawing) at the surface facing the recording medium is greater than the width dimension of each of the lower magnetic pole layer 39, the gap layer 40, the upper magnetic pole layer 41 and the upper core layer 42 at the surface facing the recording medium. The width dimension T1 is about 5 μm to 30 μm. The length dimension L1 of the protruding layer 32 in the height direction is about 2 μm to 3 μm. The thickness dimension H1 of the protruding layer 32 is about 2.5 μm to 4 μm.

Next, a plated underlying layer for forming the lower magnetic pole layer 39 will be described below. In FIG. 3, the same reference numerals as those in FIG. 1 denote the same layers, and the description thereof is omitted.

As shown in FIG. 3, a second plated underlying layer 50 is formed on the protruding layer 32 to extend from the surface facing the recording medium in the height direction (the Y direction shown in the drawing). Furthermore, a first plated underlying layer 51 is formed on the coil insulating layer 36 to extend from a position at a predetermined distance from the rear end surface of the second plated underlying layer 50 in the height direction. The first plated underlying layer 51 is formed over the coil insulating layer 36 and the back gap layer 33 in the height direction (the Y direction).

As shown in FIG. 3, the Gd-determining layer 38 is formed to fill in the space 52 between the first plated underlying layer 51 and the second plated underlying layer 50 and to overlap with the upper surfaces of the first plated underlying layer 51 and the second plated underlying layer 50.

As shown in FIG. 3, the lower magnetic pole layer 39 is formed by plating on the second plated underlying layer 50 exposed between the front end surface 38a of the Gd-determining layer 38 and the surface facing the recording medium, and on the first plated underlying layer 51 exposed in the region extending from the rear end surface 38b of the Gd-determining layer 38 in the height direction. Furthermore, the gap layer 40 is formed on the lower magnetic pole layer 39.

In FIG. 3, the space 52 is provided between the first and second plated underling layers 51 and 50, and the Gd-determining layer 38 fills in the space 52. If the first and second plated underlying layers 51 and 50 are provided as a continuous plated underlying layer by using a magnetic material, a magnetic flux partially leaks to the outside through the plated underlying layer in recording to cause a magnetic loss, resulting in deterioration of the recording properties. Therefore, the first and second plated underlying layers 51 and 50 are provided with the space 52 therebetween.

The first plated underlying layer 51 may be made of a nonmagnetic metal material such as Cu or the like, not a magnetic material. On the other hand, the second plated underlying layer 50 must be made of a magnetic material. This is because the second plated underlying layer 50 is exposed at the surface facing the recording medium. If the second plated underlying layer 50 comprises a nonmagnetic metal material, the second plated underlying layer 50 functions as a pseudo-gap to cause deterioration in the recording properties. Therefore, the second plated underlying layer 50 must be made of a magnetic material, while the material of the first plated underlying layer 51 is not limited to the magnetic material because it is separated from the surface facing the recording medium in the height direction.

The second plated underlying layer 50 is not necessarily formed. This is because the surface of the protruding layer 32 can function as the surface of a plated underlying layer. The first plated underlying layer 51 may be formed on at least a portion of the flat surface between the rear end surface 38b of the Gd-determining layer 38 and the front end surface 33a of the back gap layer 33. The portion of the first plated underlying layer 51, which is formed on the back gap layer 33, may be removed before the lower magnetic pole layer 39 is formed by plating, or the first plated underlying layer 51 may be formed so as not to be formed on the top of the back gap layer 33. Particularly, when the first plated underlying layer 51 comprises the nonmagnetic metal material, the portion of the first plated underlying layer 51, which is formed on the gap layer 33, causes a magnetic loss. In this case, the first plated underlying layer 51 is preferably formed so as not to be formed on the top of the back gap layer 33.

In FIG. 4, a third plated underlying layer 53 is formed on only a portion of the Gd-determining layer 38 rather than the entire Gd-determining layer 38. One reason for partially providing the third plated underlying layer 53 on the Gd-determining layer 38 is to promote plating growth of the upper magnetic pole layer 41 on the third plated underlying layer 53 for preventing the formation of an excessively thin upper magnetic pole layer 41 on the Gd-determining layer 38 by plating.

Another reason for partially providing the third plated underlying layer 53 on the Gd-determining layer 38 (rather than the entire Gd-determining layer 38) is that if the third plated underlying layer 53 is provided in a wide region including the front end surface 38a, the top and the rear end surface 38b of the Gd-determining layer 38, the lower magnetic pole layer 39 and the gap layer 40 are easily grown on the Gd-determining layer 38 by plating. As a result, unlike in the case shown in FIG. 4, the lower magnetic pole layer 39 and the gap layer 40 cannot be formed in both the region ahead of the Gd-determining layer 38 and the region behind the Gd-determining layer 38 by plating without being connected, thereby impairing the effect of the Gd-determining layer 38. Thus, the third plated underlying layer 53 is partially provided on the Gd-determining layer 38 and is separated from the lower magnetic pole layer 39 and the gap layer 40.

Figure 5:
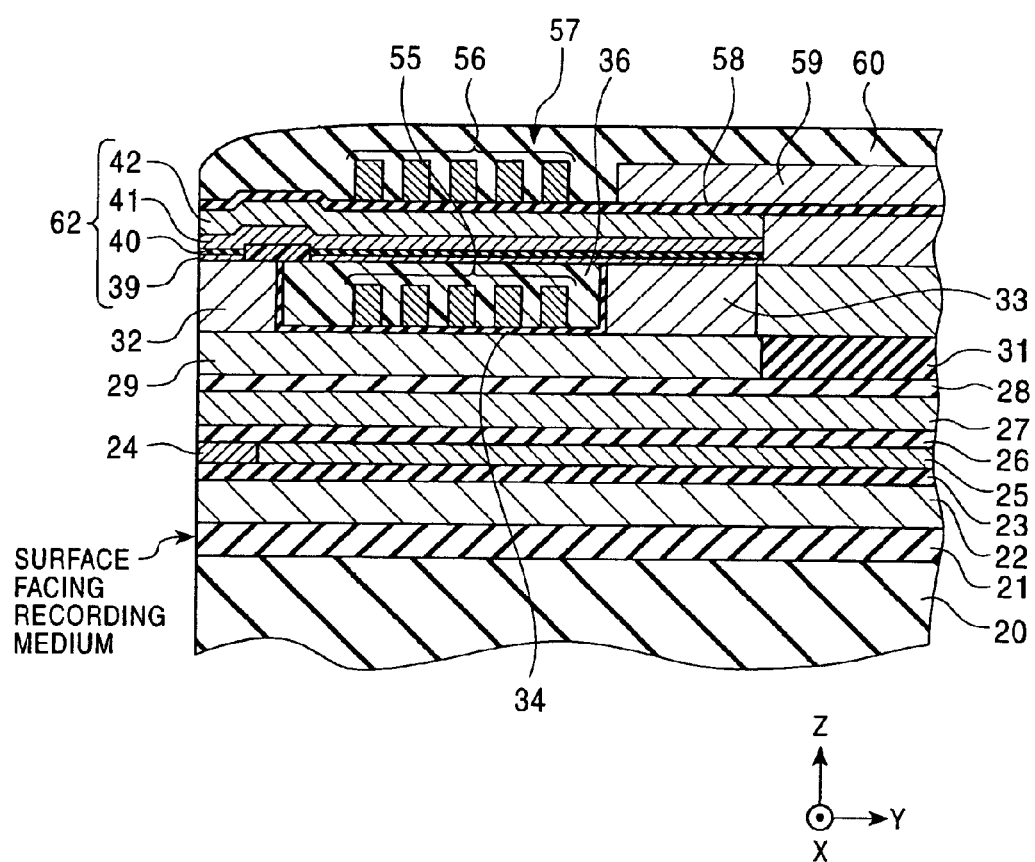
FIG. 5 is a longitudinal sectional view showing a structure of a thin film magnetic head according to a second embodiment of the present invention.
Figure 6:
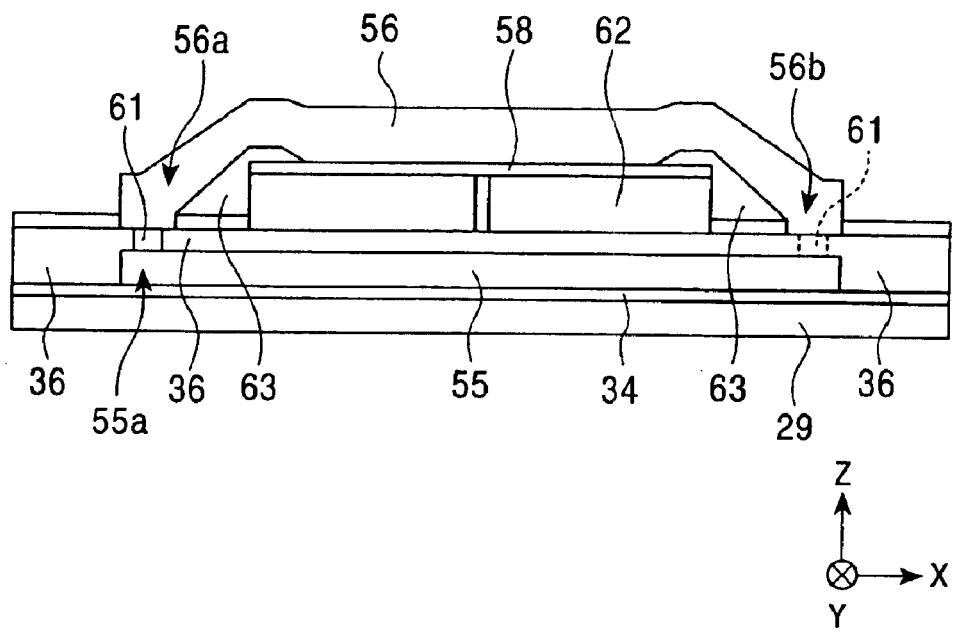
FIG. 6 is a partial front view of the thin film magnetic head shown in FIG. 5.
Figure 7:
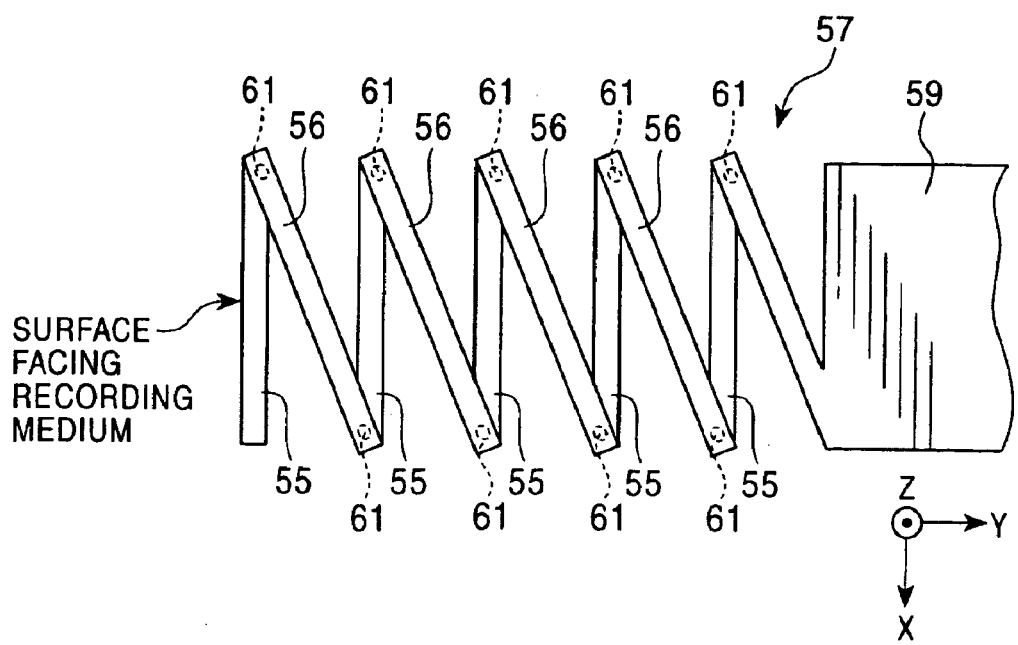
FIG. 7 is a partial plan view showing the coil shape of a coil layer of the thin film magnetic head shown in FIG. 5.

FIG. 5 is a longitudinal sectional view of a thin film magnetic head according to a second embodiment of the present invention, FIG. 6 is a partial front view of the thin film magnetic head shown in FIG. 5, and FIG. 7 is a partial plan view showing the coil shape of a coil layer of the thin film magnetic head shown in FIG. 5. In the partial front view of FIG. 6, a protruding layer 32 and the like are omitted.

In FIG. 5, the same reference numerals as those in FIG. 1 denote the same layers as in FIG. 1. The embodiment shown in FIG. 5 is different in a method of winding a coil layer from the embodiment shown in FIG. 1.

In the thin film magnetic head shown in FIG. 5, a plurality of first coil segments 55 is formed in parallel to each other in a space surrounded by the lower core layer 29, the protruding layer 32 and the back gap layer 33.

The first coil segments 55 are arranged in parallel to, for example, the track width direction (the X direction), as shown in the plan top view of FIG. 7.

As shown in FIG. 5, an insulating layer 58 comprising an insulating material, for example, $Al_2O_3$ or the like is formed over the lower magnetic pole layer 39, the gap layer 40, the upper magnetic pole layer 41 and the upper core layer 42, and a plurality of second coil segments 56 is formed in parallel to each other on the insulating layer 58.

The second coil segments 56 are arranged, for example, in a direction inclined from the track width direction (the X direction), as shown in the plan top view of FIG. 7.

In this way, the first coil segments 55 are non-parallel to the second coil segments 56, and as shown in FIGS. 6 and 7, an end 55a of each first coil segment 55 and an end 56a of each second coil segment 56 face each other in the thickness direction (the Z direction) of the four layers 62, and are connected to each other through a connecting portion 61. The connecting portion 61 shown by dotted lines on the right side of FIG. 6 connects an end 55a of the first coil segment 55 next (in the Y direction) to the first coil segment 55 shown in the drawing to an end 56b of the second coil segment 56 shown in the drawing.

In this way, an end of each of the first coil segments 55 and an end of each of the second coil segments 56 face each other in the thickness direction of the four layers 62, and are connected to each other through the connecting portion 61 to form a toroidal coil layer 57. In FIG. 5, reference numeral 60 denotes a protective layer comprising $Al_2O_3$ or the like; in FIG. 6, reference numeral 63 denotes, for example, a resist layer; and in FIGS. 5 and 7, reference numeral 59 denotes an extension layer. The extension layer 59 is formed in the same step as that for forming the second coil segments 56.

The reason why the so-called toroidal coil layer 57 shown in FIGS. 5 to 7 can be formed is that the top of the protruding layer 32, the top of the coil insulating layer 36, and the top of the back gap layer 33 can be planarized, and the four layers 62 including the lower magnetic pole layer 39, the gap layer 40, the upper magnetic pole layer 41 and the upper core layer 42 can be formed on the planarized surface. As a result, the top of the upper core layer 42 can be formed in a substantially flat surface, and the second coil segments 56 can be simply formed in a predetermined shape on the upper core layer 42 with high precision.

The method of manufacturing the thin film magnetic head shown in FIG. 1 will be described below with reference to FIGS. 8 to 14 which are drawings respectively showing manufacturing steps. The method forming each of the layers ranging from the lower core layer 29 to the upper core layer 42 shown in FIG. 1 will be described. Each of the drawings is a longitudinal sectional view showing a step for manufacturing the thin film magnetic head in the course of manufacture.

Figure 8:
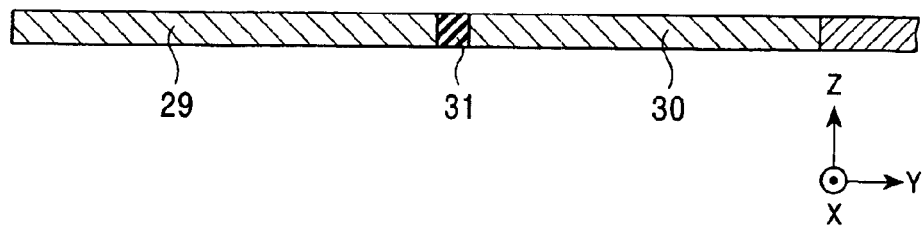
FIG. 8 is a drawing showing a step of a method of manufacturing the thin film magnetic head shown in FIG. 1.

In the step shown in FIG. 8, the lower core layer 29 comprising a NiFe alloy or the like, and the raising layer 30 are formed by plating, and the space between the lower core layer 29 and the raising layer 30 is filled with the nonmagnetic material layer 31 composed of $Al_2O_3$ or the like. Then, the surfaces of the lower core layer 29, the nonmagnetic material layer 31 and the raising layer 30 are polished to a flat surface.

Figure 9:
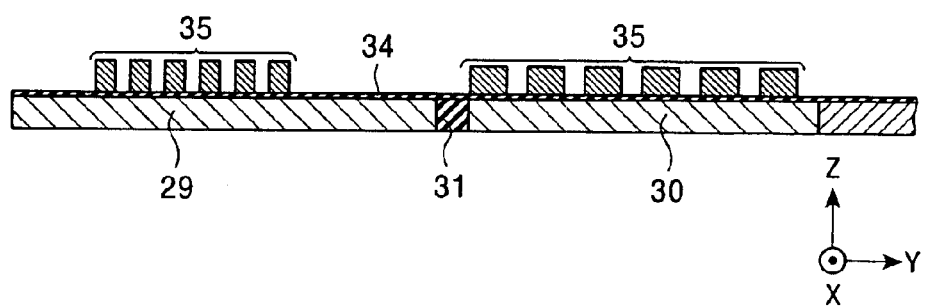
FIG. 9 is a drawing showing a step after the step shown in FIG. 8.

In the next step shown in FIG. 9, the coil insulating underlying layer 34 composed of $Al_2O_3$ is formed over the surface of the lower core layer 29, the surface of the nonmagnetic material layer 31 and the surface of the raising layer 30 by sputtering or the like. Next, the coil layer 35 is spirally formed on the coil insulating underlying layer 34. The coil layer 35 is formed by plating a nonmagnetic conductive material such as Cu or the like.

Figure 10:
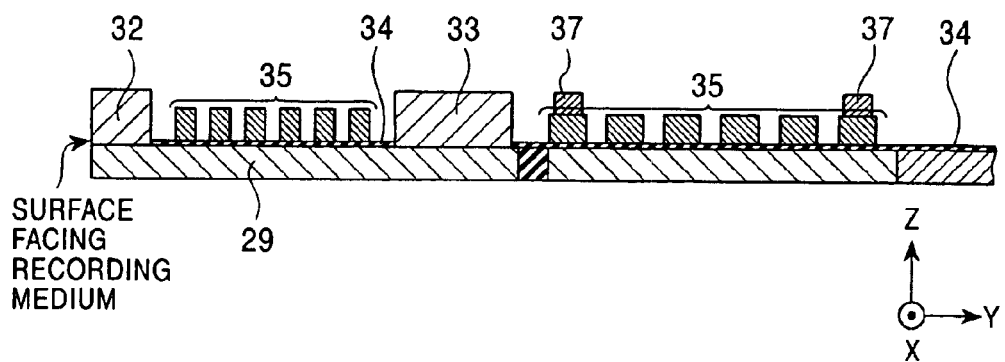
FIG. 10 is a drawing showing a step after the step shown in FIG. 9.

In the next step shown in FIG. 10, the coil insulating underlying layer 34 is removed, by etching, from a region between the surface facing the recording medium and the front end surface of the coil layer 35 near the surface facing the recording medium, and from a region near the base end portion of the lower core layer 29. Then, the protruding layer 32 is formed on the lower core layer 29 to extend for a predetermined length from the surface facing the recording medium in the height direction (the Y direction). In the same step, the back gap layer 33 is formed on the base end portion of the lower core layer 29. The protruding layer 32 and the back gap layer 33 are magnetically connected to the lower core layer 29 without the coil insulating underlying layer 34 provided therebetween.

In the step shown in FIG. 10, the bottom-raising layer 37 is preferably formed on the coil center 35a and the coil end 35b of the coil layer 35 at the same time as the protruding layer 32 and the back gap layer 33 are formed.

The protruding layer 32, the back gap layer 33 and the bottom-raising layer 37 can be formed by a method in which a pattern for these layers is formed in a resist layer by exposure, and then filled with a magnetic material layer by sputtering or the like. Then, the resist layer is removed.

As shown in FIG. 10, the top of the protruding layer 32, the top of the back gap layer 33 and the top of the bottom-raising layer 37 are formed at substantially the same height. The step shown in FIG. 10 may be performed after the step shown in FIG. 8, and then the step shown in FIG. 9 may be performed. In this case, the bottom-raising layer 37 is formed in another step after the coil layer 35 is formed.

Figure 11:
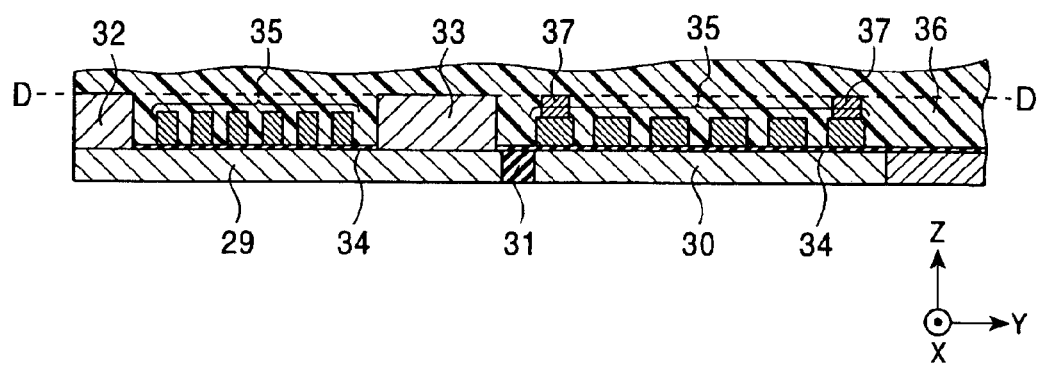
FIG. 11 is a drawing showing a step after the step shown in FIG. 10.

In the step shown in FIG. 11, the top of the coil layer 35, the top of the protruding layer 32, the top of the back gap layer 33 and the top of the bottom-raising layer 37 are covered with the coil insulating layer 36 composed of $Al_2O_3$ or the like. The coil insulating layer 36 is formed by sputtering.

Figure 12:
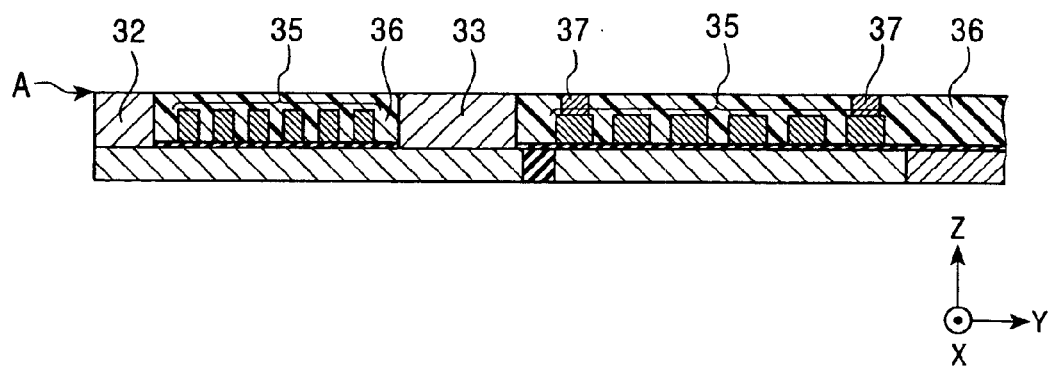
FIG. 12 is a drawing showing a step after the step shown in FIG. 11.

Then, the coil insulating layer 36 is cut to line D—D in FIG. 11 by a CMP technique or the like in the direction parallel to the X-Y plane. FIG. 12 shows a state after the completion of cutting.

In FIG. 12, the top of the protruding layer 32, the top of the coil insulating layer 36, the top of the back gap layer 33 and the top of the bottom-raising layer 37 are planarized to a flat surface along the reference plane A. As shown in FIG. 12, the coil layer 35 is completely buried in the coil insulating layer 36.

Figure 13:
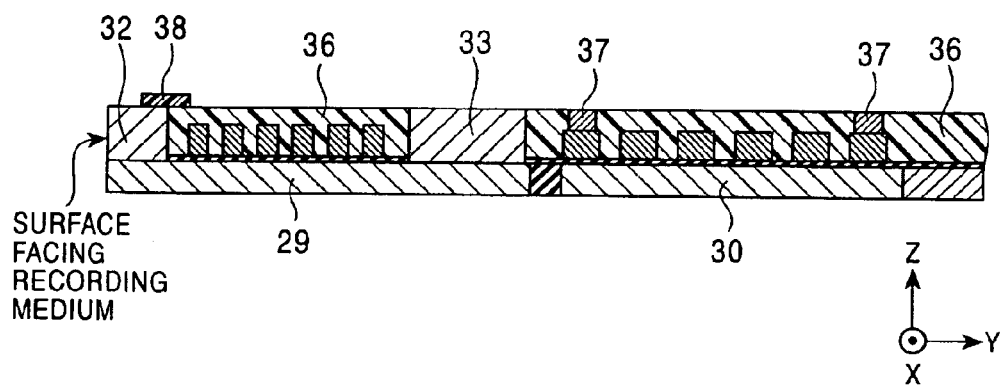
FIG. 13 is a drawing showing a step after the step shown in FIG. 12.

In the next step shown in FIG. 13, the first and second plated underlying layers 51 and 50 shown in FIG. 3 are first formed on the planarized surface by sputtering, and then the Gd-determining layer 38 is formed at a distance from the surface facing the recording medium in the height direction (the Y direction) so as to fill in the space 52 between the first and second plated underlying layers 51 and 50. The Gd-determining layer 38 may comprise an inorganic or organic insulating material. However, in this embodiment, the Gd-determining layer 38 comprises an organic insulating material such as resist or the like. After the Gd-determining layer 38 is formed at the predetermined position, the Gd-determining layer 38 is thermally cured by heat treatment. In this step, the surface of the Gd-determining layer 38 comprising the organic insulating material is rounded. Next, the third plated underlying layer 53 is partially formed on the Gd-determining layer 38 as shown in FIG. 4. Although there are several methods for partially forming the third plated underlying layer 53, one such method in particular comprises forming a resist layer on portions of the Gd-determining layer 38, in which the third plated underlying layer 53 is not to be formed, forming the third plated underlying layer 53 on the Gd-determining layer 38 by sputtering, and then removing the resist layer. As described above with reference to FIG. 3, the first plated underlying layer 51 may comprise the nonmagnetic metal material. Also, the first plated underlying layer 51 may also be formed on the back gap layer 33. When the first plated underlying layer 51 is also formed on the back gap layer 33, the first plated underlying layer 51 may be then removed from the top of the back gap layer 33 by etching. Furthermore, the second plated underlying layer 50 is not necessarily formed. When the second plated underlying layer 50 is formed, it is made of a magnetic material. The third plated underlying layer 53 may comprise a magnetic material or nonmagnetic metal material.

Figure 14:
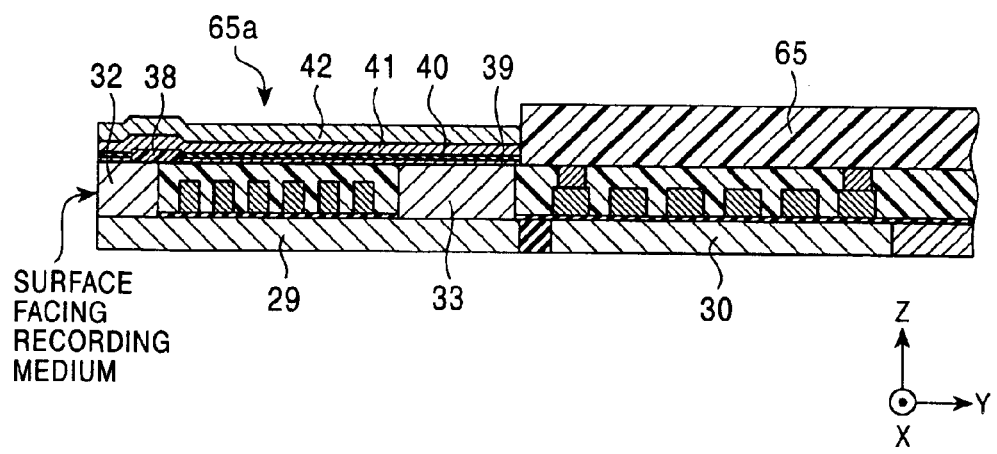
FIG. 14 is a drawing showing a step after the step shown in FIG. 13.

In the next step shown in FIG. 14, a resist layer 65 is formed in a pattern 65a, for example, having the planar shape comprising the front end portion B and the rear end portion C shown in FIG. 2, and the lower magnetic pole layer 39, the gap layer 40, the upper magnetic pole layer 41 and the upper core layer 42 are formed in the pattern 65a by plating in that order from the bottom.

The lower magnetic pole layer 39, the gap layer 40, the upper magnetic pole layer 41 and the upper core layer 42 have a planar shape comprising the elongated front end portion B extending from the surface facing the recording medium in the height direction (the Y direction), and the rear end portion C in which the width in the track width direction (the X direction) gradually increases from the base end B1 of the front end portion B in the height direction. In this case, the track width Tw is defined by the width dimension of the upper magnetic pole layer 41 in the track width direction (the X direction) at the surface facing the recording medium. Then, the resist layer 65 is removed.

The step shown in FIG. 14 is characterized in that the lower magnetic pole layer 39, the gap layer 40 and the upper magnetic pole layer 41 are formed by plating to extend from the surface facing the recording medium to the top of the back gap layer 33, and the upper core layer 42 is further continuously formed on the upper magnetic pole layer 41 by plating.

The lower magnetic pole layer 39, the gap layer 40 and the upper magnetic pole layer 41 basically constitute a magnetic pole, and are thus generally formed in a portion ranging from the surface facing the recording medium to the top of the Gd-determining layer 38.

However, in this step, the lower magnetic pole layer 39, the gap layer 40 and the upper magnetic pole layer 41 are formed to extend to the top of the back gap layer 33 so that the lower magnetic pole layer 39, the gap layer 40 and the upper magnetic pole layer 41 function as a "yoke" in the region behind the Gd-determining layer 38 in the same manner as the upper core layer 42.

In this way, when the lower magnetic pole layer 39, the gap layer 40 and the upper magnetic pole layer 41 are formed to extend to the top of the back gap layer 33, the upper core layer 42 can be continuously formed on the upper magnetic pole layer 41 by plating.

As described above, when the lower magnetic pole layer 39, the gap layer 40 and the upper magnetic pole layer 41 are partially formed, a coil layer and insulating layer are generally formed behind the three layers. In this case, the upper surfaces of the upper magnetic pole layer 41 and the layer behind the upper magnetic pole layer 41 must be planarized by the CMP technique or the like, and thus the upper core layer 42 is formed after the planarizing step. However, in the step shown in FIG. 14, the lower magnetic pole layer 39, the gap layer 40 and the upper magnetic pole layer 41 are formed to extend to the top of the back gap layer 33 to eliminate the need for the planarizing step, thereby permitting the upper core layer 42 to be formed directly on the upper magnetic pole layer 41 by plating. Therefore, the upper core layer 42 can easily be formed on the substantially planarized surface of the upper magnetic pole layer 41 by a small number of steps, and thus the upper core layer can be formed in a predetermined shape with high precision.

In the step shown in FIG. 14, the upper magnetic pole layer 41 and the lower magnetic pole layer 39 can be formed by using a material having a higher saturation magnetic flux density than those of the upper core layer 42, the lower core layer 29, the protruding layer 32 and the back gap layer 33. Consequently, a recording magnetic field can be concentrated near the gap to improve the recording density, and the magnetic flux efficiency can be improved by providing a layer having a high saturation magnetic flux density near the coil layer 35, thereby improving the recording properties.

In the step shown in FIG. 14, the gap layer 40 is formed by plating, and thus the gap layer 40 is preferably made of a nonmagnetic metal material which can be plated. The gap layer 40 is preferably made of at least one material selected from NiP, NiPd, NiW, NiMo, Au, Pt, Rh, Pd, Ru, and Cr. By using any of these materials, the gap layer 40 can be appropriately formed to a predetermined thickness, and can be appropriately made non-magnetic.

When the gap layer 40 is made of a NiP alloy, the gap layer 40 is easily fabricated by plating as well as having excellent heat resistance and high adhesion to the upper magnetic pole layer 41. The gap layer 40 preferably comprises a NiP alloy containing 8% by mass to 15% by mass of P. Therefore, the gap layer 40 can be made stably nonmagnetic without concern of external factors, for example, generated heat or the like influencing the nonmagnetic properties. The alloy composition of the gap layer 40 comprising the NiP alloy or the like can be measured by a X-ray analyzer, a wave dispersive linear analyzer, or the like in combination with SEM, TEM or the like.

In forming the toroidal coil layer 57 shown in FIGS. 5 to 7, the plurality of first coil segments 55 is formed in the step shown in FIG. 9, and the connecting portions 61 shown in FIGS. 6 and 7 are formed at the same time as the protruding layer 32 and the back gap layer 33 are formed in the step shown in FIG. 10. Furthermore, an insulating layer 58 and resist layer 63 are formed on the upper core layer 42 after the step shown in FIG. 14, and then the plurality of second coil segments 56 is formed on the insulating layer 58. In this step, an end of each of the second coil segments 56 may be magnetically connected to the corresponding connecting portion 61 to form the toroidal coil layer 57.

As described above, in the method of manufacturing the thin film magnetic head, the lower magnetic pole layer, the gap layer, the upper magnetic pole layer and the upper core layer can be easily formed in the predetermined shape with high precision by a small number of manufacturing steps.

Figure 15:
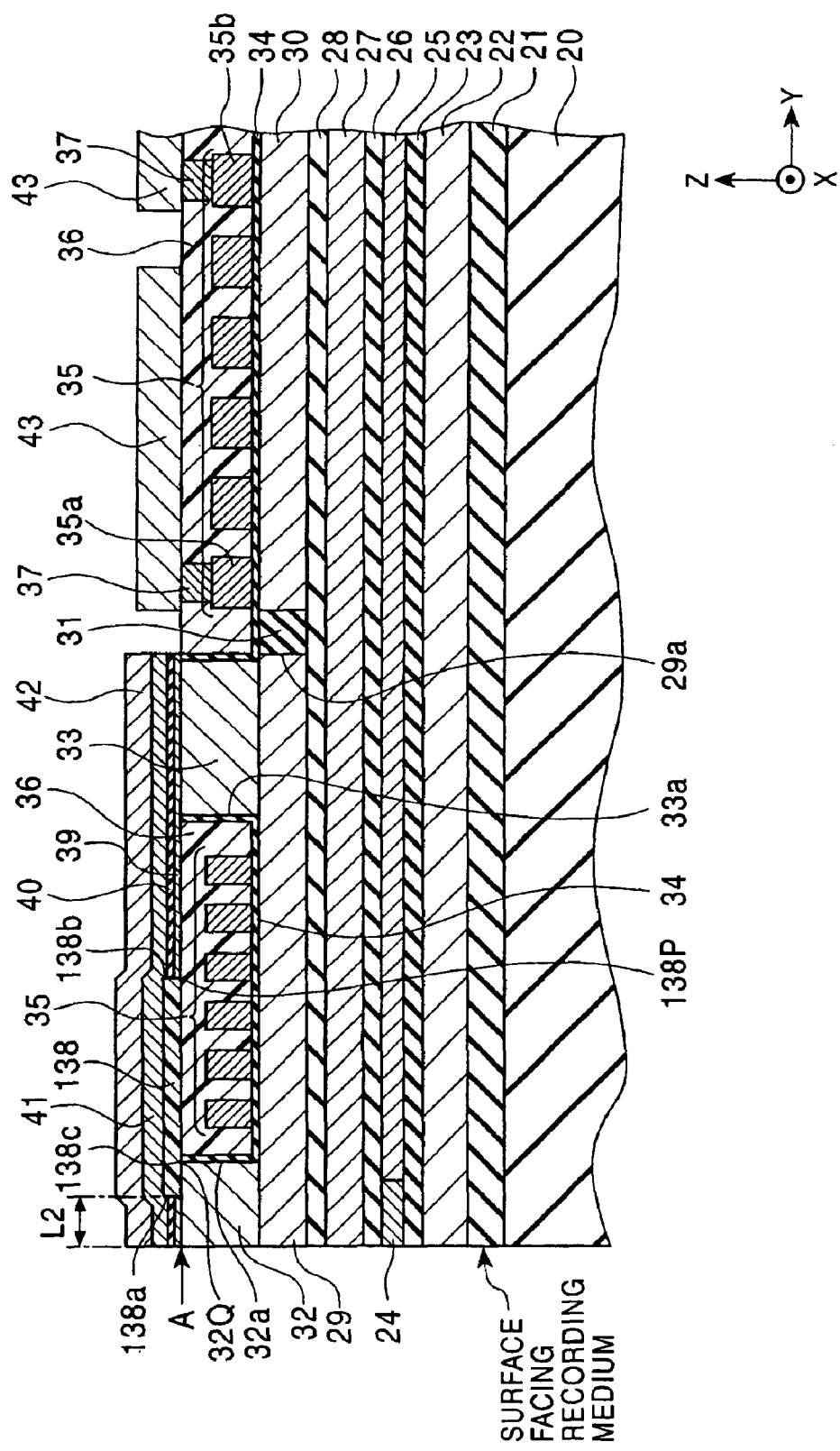
FIG. 15 is a longitudinal sectional view showing a first example of a structure of a thin film magnetic head according to a third embodiment of the present invention.
Figure 16:
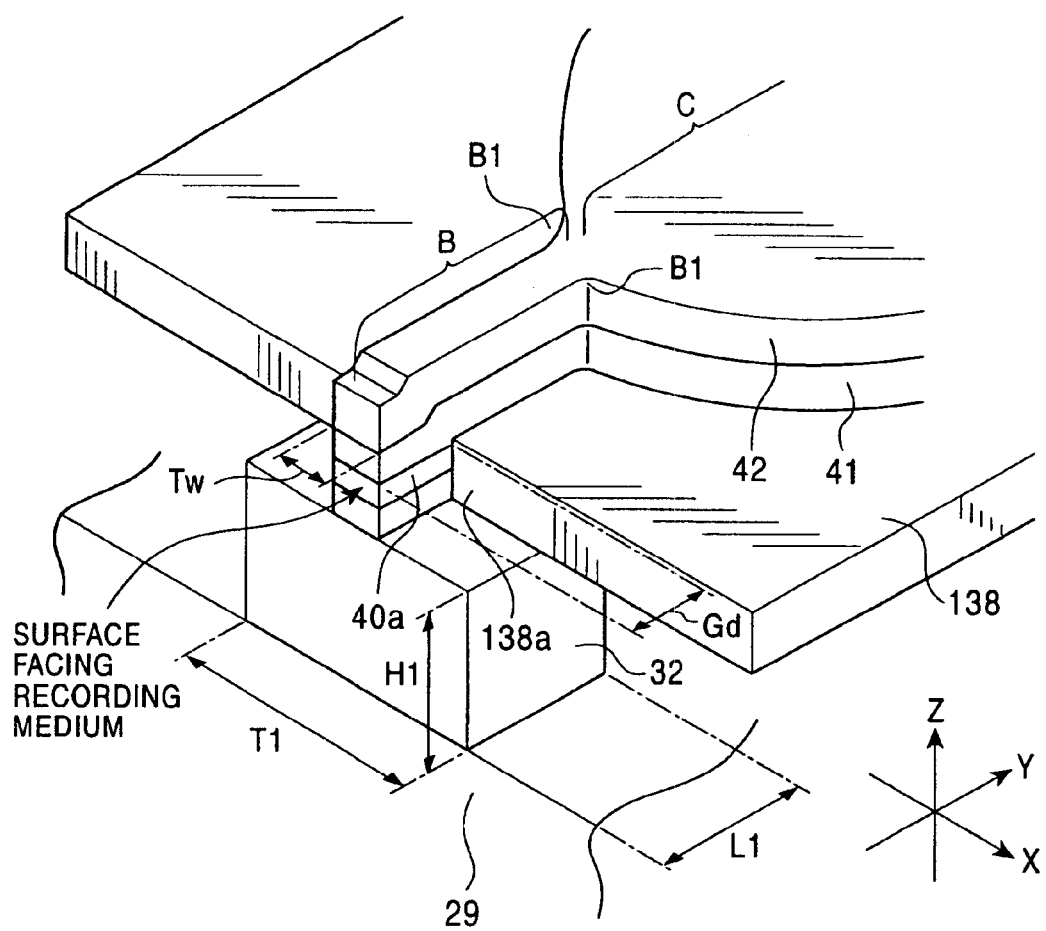
FIG. 16 is a partial perspective view of the thin film magnetic head shown in FIG. 15.
Figure 17:
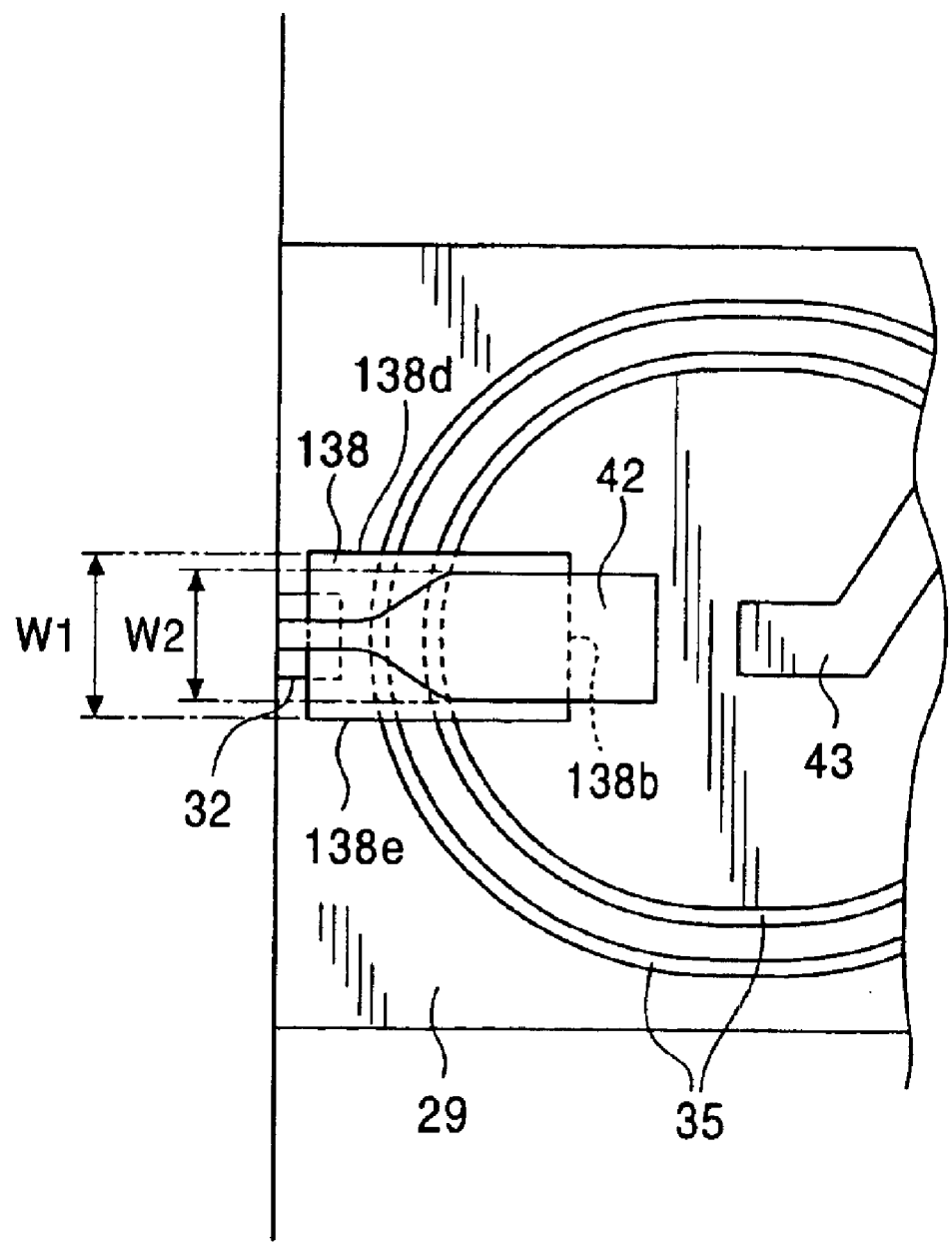
FIG. 17 is a partial plan view of the thin film magnetic head shown in FIG. 15.
Figure 18:
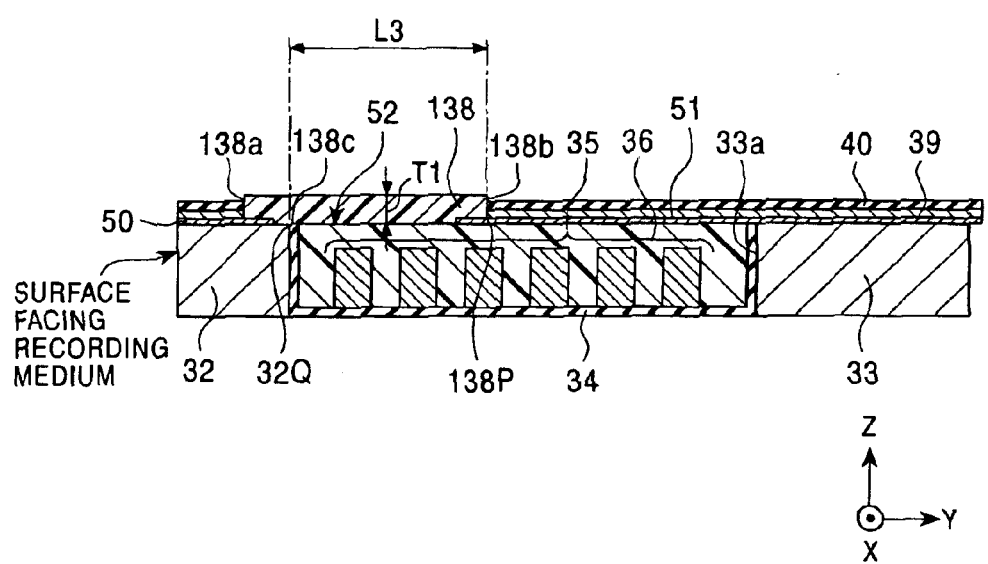
FIG. 18 is an enlarged longitudinal partial sectional view of the thin film magnetic head shown in FIG. 15.

FIG. 15 is a longitudinal partial sectional view showing a first example of a structure of a thin film magnetic head according to a third embodiment of the present invention, FIG. 16 is an enlarged partial perspective view showing a portion of the structure of the thin film magnetic head shown in FIG. 15, FIG. 17 is a partial plan view of the thin film magnetic head shown in FIG. 15, and FIG. 18 is a longitudinal partial sectional view of the thin film magnetic head shown in FIG. 15.

The thin film magnetic head shown in FIG. 15 comprises substantially the same structure as that of the thin film magnetic head shown in FIGS. 1 to 4. Therefore, in the thin film magnetic head shown in FIG. 15, the same constituent components as those of the thin film magnetic head shown in FIGS. 1 to 4 are denoted by the same reference numerals, and the detailed description thereof is omitted.

In the thin film magnetic head shown in FIG. 15, the top of the protruding layer 32, the top of the coil insulating layer 36, the top of the back gap layer 33 and the top of the bottom-raising layer 37 are planarized to a continuous flat surface along the reference plane A shown in FIG. 15.

A Gd-determining layer 138 is formed on the flat surface to extend from a position at a minimum distance L2 from the surface facing the recording medium in the height direction (the Y direction). The front end surface 138a of the Gd-determining layer 138 is positioned on the protruding layer 32, and the rear end surface 138b of the Gd-determining layer 138 is positioned on the coil insulating layer 36.

As shown in FIG. 17, the width dimension W1 of the Gd-determining layer 138 in the track width direction is preferably slightly larger than the maximum width dimension W2 of the upper core layer 42 in the track width direction. One reason for this is that since the Gd-determining layer 138 is formed, a stepped portion is formed on the upper magnetic pole layer 41 due to the thickness dimension T2 of the Gd-determining layer 138. The upper core layer 42 is formed on the upper magnetic pole layer 41 with a plated underlying layer provided therebetween, and the stepped portion is formed on the upper core layer 42. If the width dimension W1 of the Gd-determining layer 138 is smaller than the maximum width dimension W2 of the upper core layer 42, two stepped portions extending in the height direction occurs on the plated underlying layer for forming the upper core layer 42 due to both side edges 138d and 138e of the Gd-determining layer 138, and a stepped portion extending in the track width direction occurs due to the rear end surface 138b of the Gd-determining layer 138. When the stepped portions are formed on the plated underlying layer, the plated underlying layer is easily damaged in the stepped portions, and thus the core layer 2 cannot be easily formed by plating due to the damage to the plated underlying layer.

However, when the width dimension W1 of the Gd-determining layer 138 is larger than the maximum width dimension W2 of the upper core layer 42, both side edges 138d and 138e of the Gd-determining layer 138 are positioned outside the plated underlying layer for forming the upper core layer 42, and thus no stepped portion occurs on the plated underlying layer due to both side edges 138d and 138e of the Gd-determining layer 138. Therefore, the number of the stepped portions produced on the plated underlying layer can be decreased to improve the quality of the upper core layer 42.

Assuming that the length dimension from the contact portion 138c of the Gd-determining layer 138 in contact with the rear end surface 32a of the protruding layer 32 to the rear end surface 138b of the Gd-determining layer 138 is L3, the length dimension L3 is larger than the thickness dimension T1 of the Gd-determining layer 138. If the length dimension L3 is smaller than the thickness dimension T1, the magnetic resistance near the rear end surface 138b of the Gd-determining layer 138 is smaller than that near the front surface 138a of the Gd-determining layer 138. Because the magnetic flux flows more readily through a portion with low magnetic resistance, the magnetic flux flows from the upper magnetic pole layer 41 to the lower magnetic pole layer 39 near the rear end surface 138b of the Gd-determining layer 138 before flowing from the upper magnetic pole layer 41 to the lower magnetic pole layer 39 at the surface facing the recording medium, thereby easily producing a leakage of the magnetic flux. In particular, the magnetic flux easily flows from the corner 138P of the rear end surface 138*b* of the Gd-determining layer 138 to the corner 32Q of the rear end surface 32*a* of the protruding layer 32.

However, as shown in FIG. 18, in the thin film magnetic head shown in FIG. 15, the length dimension L3 is larger than the thickness dimension T1, and thus the length dimension from the corner 138P of the Gd-determining layer 138 to the corner 32Q of the rear end surface 32*a* of the protruding layer 32 is increased. Therefore, the magnetic resistance between the corner 138P to the corner 32Q increases, thereby decreasing the amount of leakage of the magnetic flux, and consequently increasing the magnetic field occurring at the surface facing the recording medium. Therefore, in the thin film magnetic head shown in FIG. 15, the recording efficiency can be increased.

Figure 19:
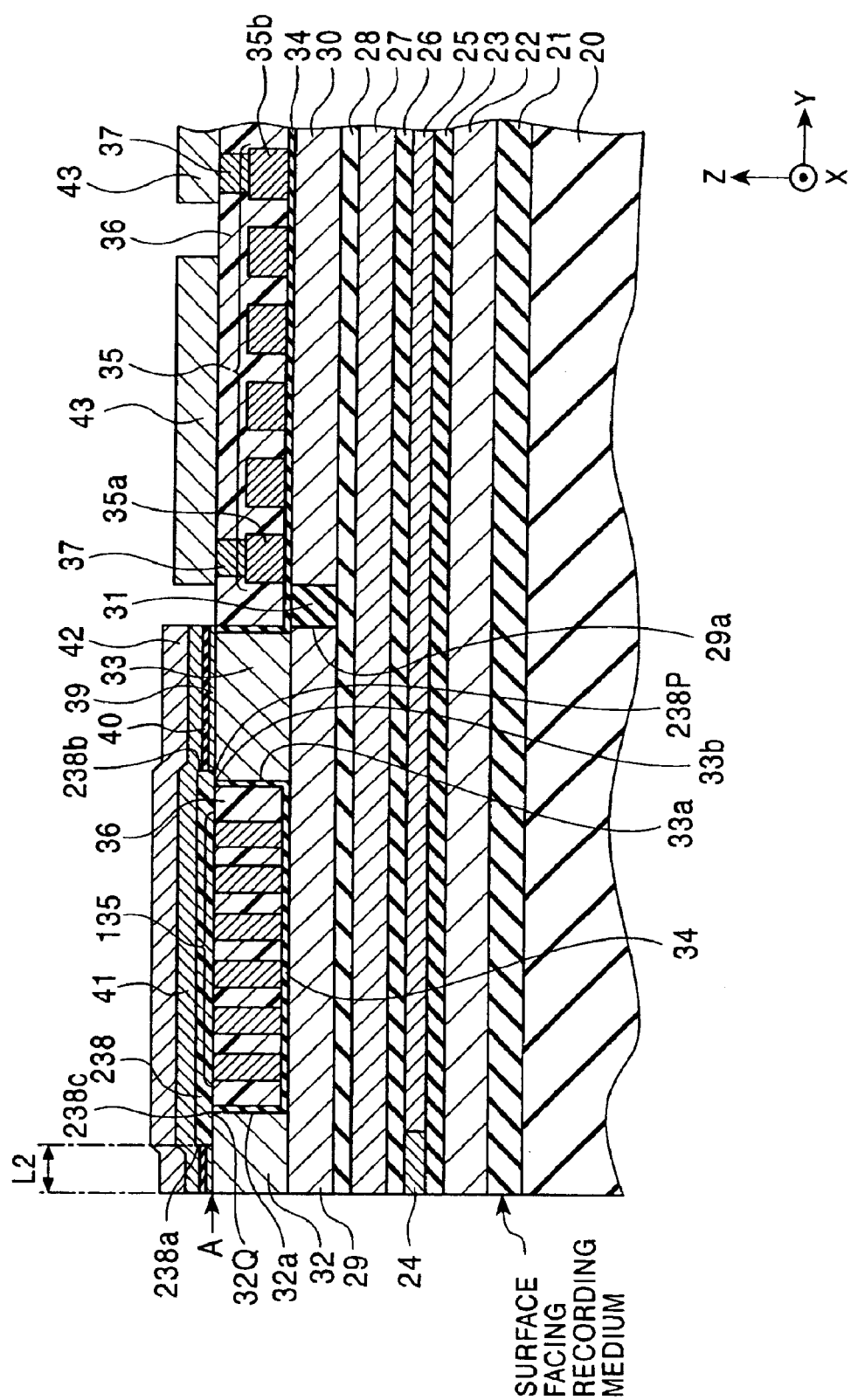
FIG. 19 is a longitudinal sectional view showing a second example of the structure of the thin film magnetic head according to the third embodiment of the present invention.
Figure 20:
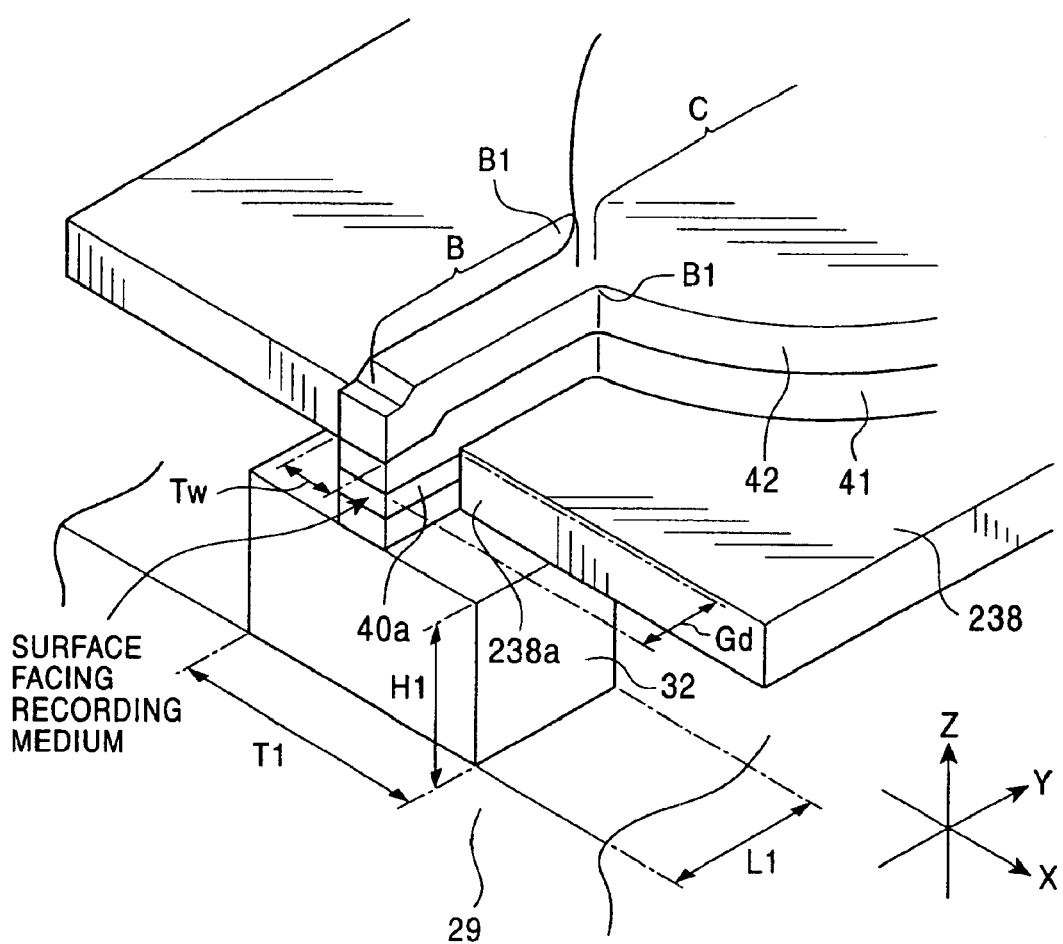
FIG. 20 is a partial perspective view of the thin film magnetic head shown in FIG. 19.
Figure 21:
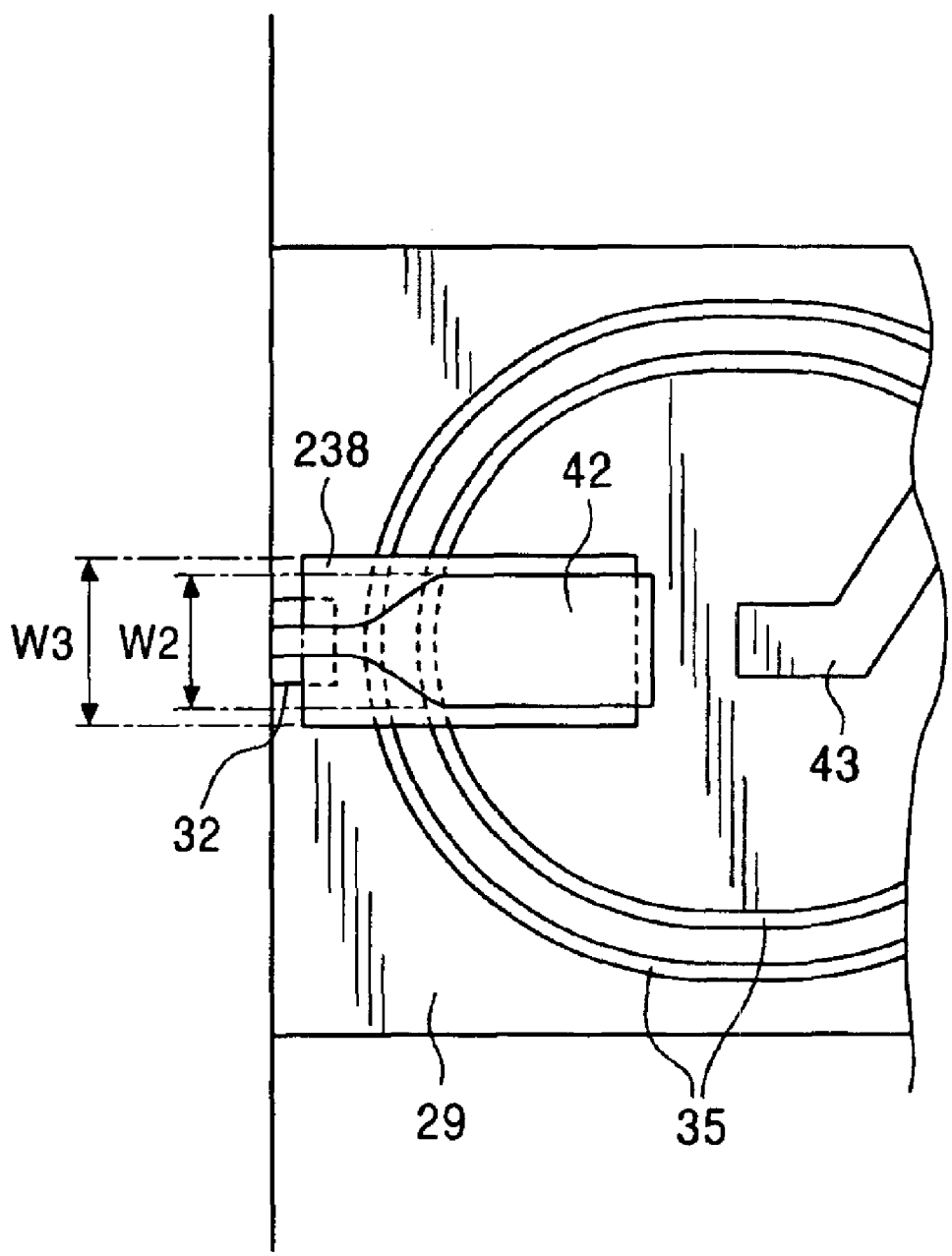
FIG. 21 is a partial plan view of the thin film magnetic head shown in FIG. 19.
Figure 22:
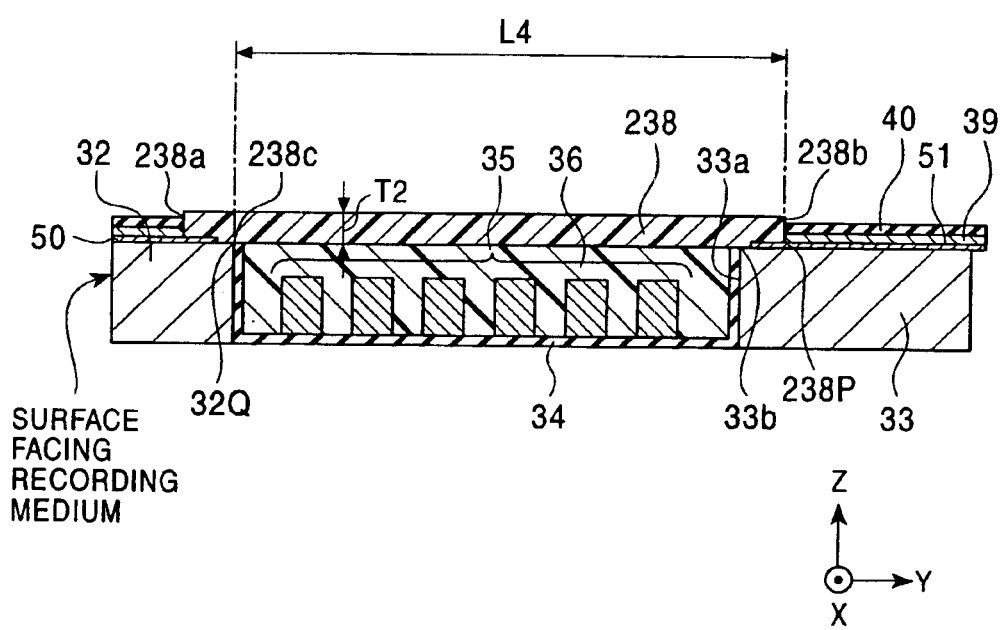
FIG. 22 is an enlarged longitudinal partial sectional view of the thin film magnetic head shown in FIG. 19.

FIG. 19 is a longitudinal partial sectional view showing a second example of the structure of the thin film magnetic head according to the third embodiment of the present invention, FIG. 20 is an enlarged partial perspective view showing a part of the structure of the thin film magnetic head shown in FIG. 19, FIG. 21 is a partial plan view of the thin film magnetic head shown in FIG. 19, and FIG. 22 is a longitudinal partial sectional view of the thin film magnetic head shown in FIG. 19.

The thin film magnetic head shown in FIG. 19 comprises substantially the same structure as that of the thin film magnetic head shown in FIGS. 1 to 4. Therefore, in the thin film magnetic head shown in FIG. 19, the same constituent components as those of the thin film magnetic head shown in FIGS. 1 to 4 are denoted by the same reference numerals, and the detailed description thereof is omitted.

In the thin film magnetic head shown in FIG. 19, the top of a coil layer 135 is formed as the reference plane A shown in FIG. 19, and the top of the protruding layer 32, the top of the coil layer 135, the top of the coil insulating layer 36, the top of the back gap layer 33 and the top of the bottom-raising layer 37 are planarized to a continuous flat surface along the reference plane A.

A Gd-determining layer 238 is formed on the flat surface to extend from a position at a minimum distance (L2) from the surface facing the recording medium in the height direction (the Y direction). The front end surface 238*a* of the Gd-determining layer 238 is positioned on the protruding layer 32, and the rear end surface 238*b* of the Gd-determining layer 238 is positioned on the back gap layer 33. The rear end surface 238*b* of the Gd-determining layer 238 may be positioned on the boundary 33*b* between the top of the back gap layer 33 and the front end surface 33*a* of the back gap layer 33 near the surface facing the recording medium.

In the thin film magnetic head shown in FIG. 19, the Gd-determining layer 238 is formed on the coil layer 135, and comprises an organic insulating material. Therefore, even when the top of the coil layer 135 is formed to a level equal to the reference plane A and to be in contact with the bottom of the Gd-determining layer 238, the coil layer 135 can be insulated. Therefore, the sectional area of the coil layer 135 can be increased to decrease the resistance. However, the present invention is not limited to this example, and like in the thin film magnetic head shown in FIG. 15, the coil layer 135 may be formed to a level lower than the reference plane A so that the coil insulating layer 36 is formed on the top of the coil layer 135.

Like in the thin film magnetic head shown in FIG. 15, in the thin film magnetic head shown in FIG. 19, the width dimension W3 of the Gd-determining layer 238 in the track width direction is preferably larger than the maximum width dimension W2 of the upper core layer 42 in the track width direction in order to improve the quality of the upper core layer 42, as shown in FIG. 21.

Assuming that the length dimension from the contact portion 238*c* of the Gd-determining layer 238 in contact with the rear end surface 32*a* of the protruding layer 32 to the rear end surface 238*b* of the Gd-determining layer 238 is L4, the length dimension L4 is larger than the thickness dimension T2 of the Gd-determining layer 238. Therefore, in the thin film magnetic head shown in FIG. 19, the length dimension from the corner 238P of the Gd-determining layer 238 to the corner 32Q of the rear end surface 32*a* of the protruding layer 32 can be increased. Thus, it is difficult for the magnetic flux to flow from the corner 238P to the corner 32Q, consequently permitting a magnetic field to occur more readily at the surface facing the recording medium. Therefore, in the thin film magnetic head shown in FIG. 19, the recording efficiency can be increased.

Figure 23:
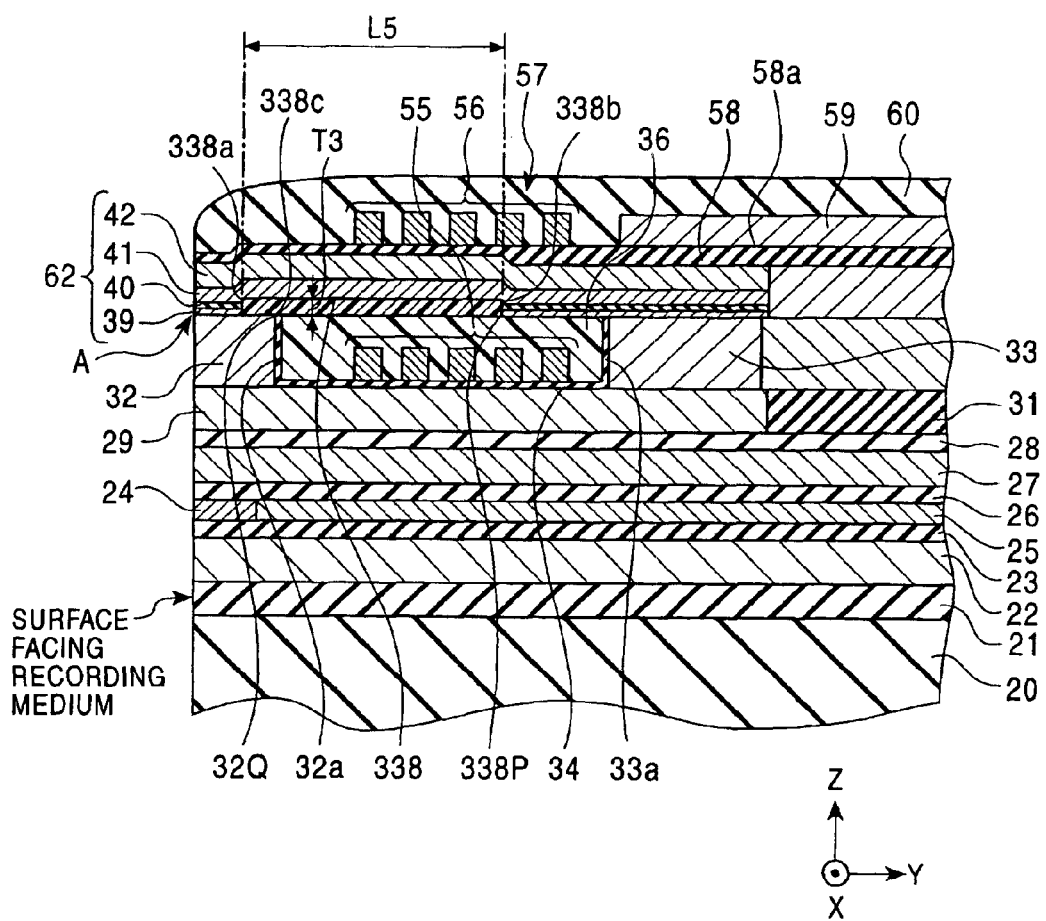
FIG. 23 is a longitudinal sectional view showing a first example of a structure of a thin film magnetic head according to a fourth embodiment of the present invention.

FIG. 23 is a longitudinal partial sectional view showing a first example of a structure of a thin film magnetic head according to a fourth embodiment of the present invention. The thin film magnetic head shown in FIG. 23 comprises substantially the same structure as that of the thin film magnetic head shown in FIGS. 5 to 7. Therefore, in the thin film magnetic head shown in FIG. 23, the same constituent components as those of the thin film magnetic head shown in FIGS. 5 to 7 are denoted by the same reference numerals, and the detailed description thereof is omitted.

In the thin film magnetic head shown in FIG. 23, the top of the protruding layer 32, the top of the coil insulating layer 36, the top of the back gap layer 33 and the top of the bottom-raising layer 37 (not shown in the drawing), which is formed at a predetermined distance from the back gap layer 33 in the height direction, are planarized to a continuous flat surface along the reference plane A shown in FIG. 23. A Gd-determining layer 338 is formed on the flat surface to extend from a position at a minimum distance (L2) from the surface facing the recording medium in the height direction (the Y direction). The front end surface 338*a* of the Gd-determining layer 338 is positioned on the protruding layer 32, and the rear end surface 338*b* of the Gd-determining layer 338 is positioned on the coil insulating layer 36.

Like in the thin film magnetic head shown in FIG. 15, in the thin film magnetic head shown in FIG. 23, the width dimension of the Gd-determining layer 338 in the track width direction is preferably larger than the maximum width dimension W2 of the upper core layer 42 in the track width direction in order to improve the quality of the upper core layer 42.

Assuming that the length dimension from the contact portion 338*c* of the Gd-determining layer 338 in contact with the rear end surface 32*a* of the protruding layer 32 to the rear end surface 338*b* of the Gd-determining layer 338 is L5, the length dimension L5 is larger than the thickness dimension T3 of the Gd-determining layer 338. Therefore, in the thin film magnetic head shown in FIG. 23, the length dimension from the corner 338P of the Gd-determining layer 338 to the corner 32Q of the rear end surface 32*a* of the protruding layer 32 can be increased. Thus, it is difficult for the magnetic flux to flow from the corner 338P to the corner 32Q, and thus a magnetic field readily occurs at the surface facing the recording medium. Therefore, in the thin film magnetic head shown in FIG. 23, the recording efficiency can be increased.

Figure 24:
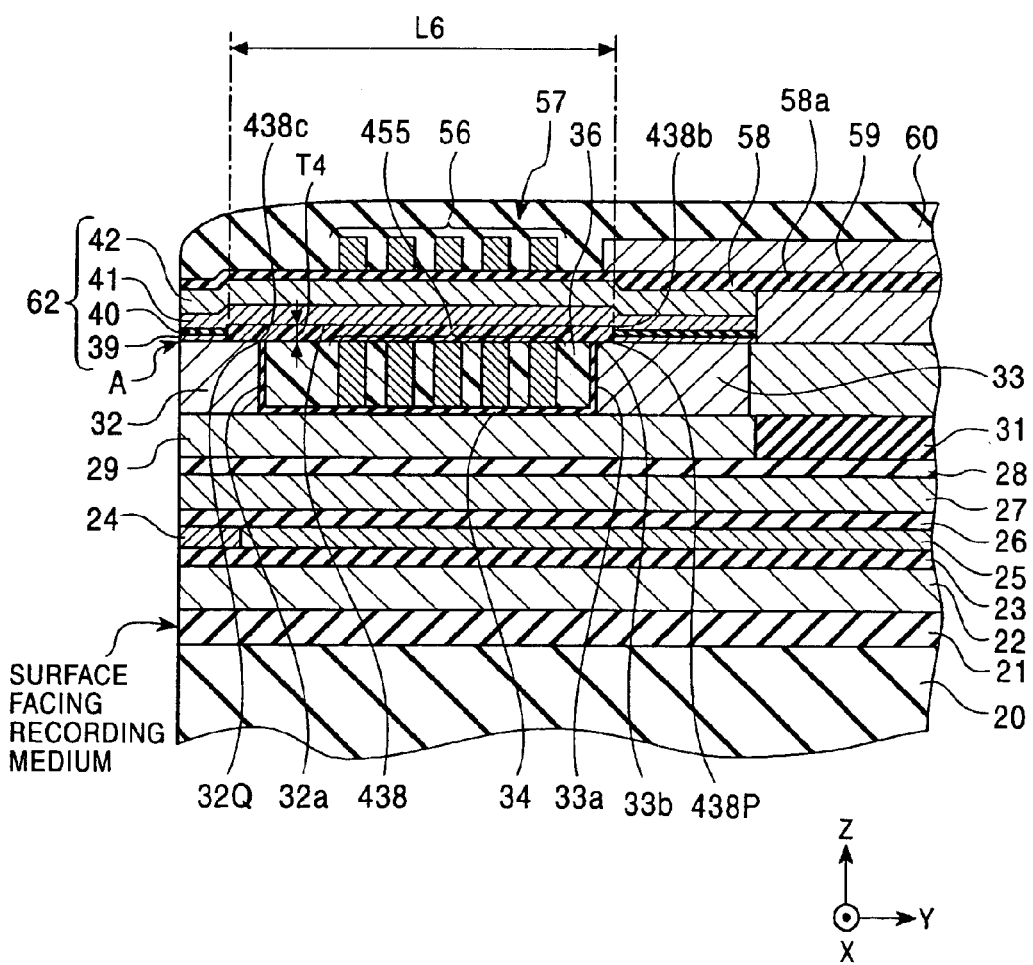
FIG. 24 is a longitudinal sectional view showing a second example of the structure of the thin film magnetic head according to the fourth embodiment of the present invention.
Figure 25:
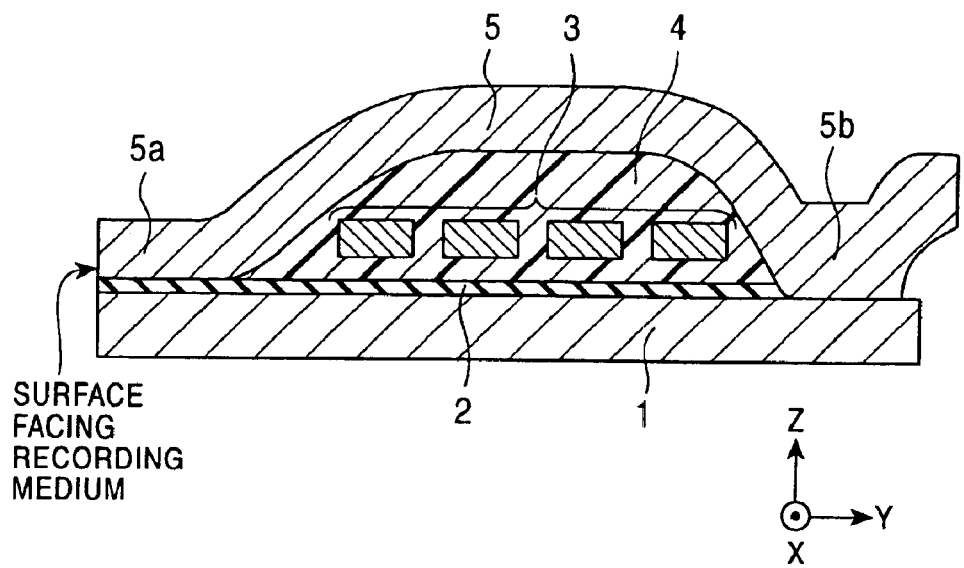
FIG. 25 is a longitudinal partial sectional view showing the structure of an example of conventional thin film magnetic heads.
Figure 26:
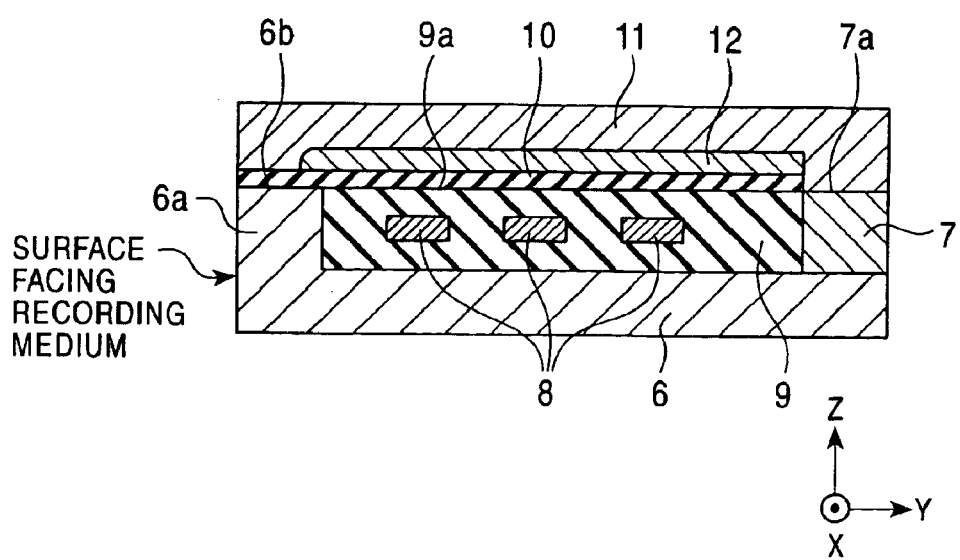
FIG. 26 is a longitudinal partial sectional view of another example of conventional thin film magnetic heads.
Figure 27:
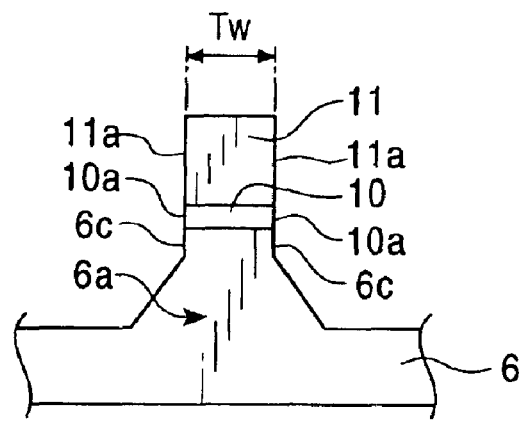
FIG. 27 is a partial front view of the thin film magnetic head shown in FIG. 26.
Figure 28:
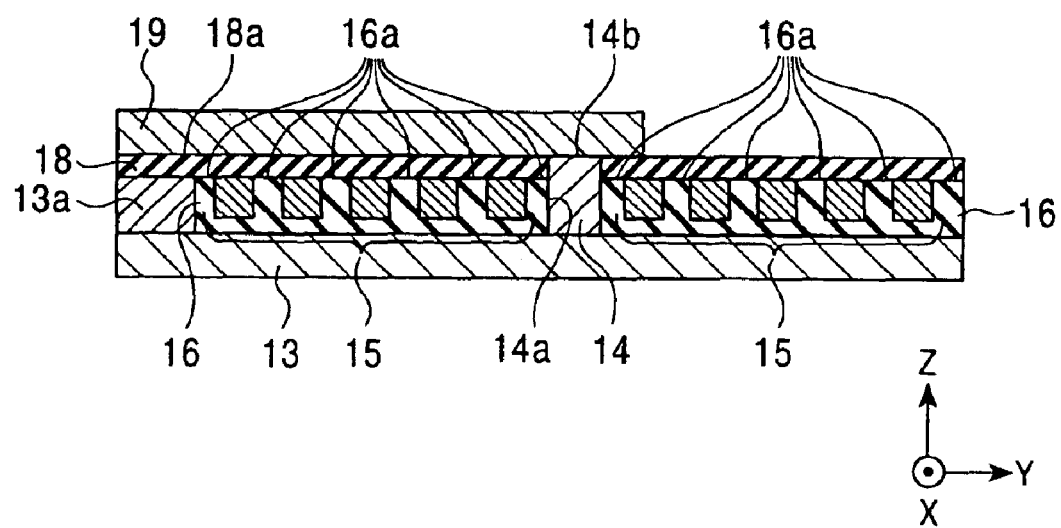
FIG. 28 is a longitudinal partial sectional view of a further example of conventional thin film magnetic heads.

FIG. 24 is a longitudinal partial sectional view showing a second example of the structure of the thin film magnetic head according to the fourth embodiment of the present invention. The thin film magnetic head shown in FIG. 24 comprises substantially the same structure as that of the thin film magnetic head shown in FIGS. 5 to 7. Therefore, in the thin film magnetic head shown in FIG. 24, the same constituent components as those of the thin film magnetic head shown in FIGS. 5 to 7 are denoted by the same reference numerals, and the detailed description thereof is omitted.

In the thin film magnetic head shown in FIG. 24, the top of a coil layer 455 is formed as the reference plane A shown in FIG. 24, and the top of the protruding layer 32, the top of the coil layer 455, the top of the coil insulating layer 36, the top of the back gap layer 33 and the top of the bottom-raising layer 37 are planarized to a continuous flat surface along the reference plane A.

A Gd-determining layer 438 is formed on the flat surface to extend from a position at a minimum distance (L2) from the surface facing the recording medium in the height direction (the Y direction). Like in the thin film magnetic head shown in FIG. 19, the front end surface 438a of the Gd-determining layer 438 is positioned on the protruding layer 32, and the rear end surface 438b of the Gd-determining layer 438 is positioned on the back gap layer 33. The rear end surface 438b of the Gd-determining layer 438 may be positioned on the boundary 33b between the top of the back gap layer 33 and the front end surface 33a of the back gap layer 33 near the surface facing the recording medium.

In the thin film magnetic head shown in FIG. 24, the Gd-determining layer 438 is formed on the coil layer 455, and comprises an organic insulating material. Therefore, even when the top of the coil layer 455 is formed to a level equal to the reference plane A and to be in contact with the bottom of the Gd-determining layer 438, the coil layer 455 can be insulated. Therefore, the sectional area of the coil layer 455 can be increased to decrease the resistance. However, the present invention is not limited to this example, and like in the thin film magnetic head shown in FIG. 23, the coil layer 455 may be formed to a level lower than the reference plane A, and the coil insulating layer 36 may be formed on the top of the coil layer 455.

Like in the thin film magnetic head shown in FIG. 15, in the thin film magnetic head shown in FIG. 24, the width dimension of the Gd-determining layer 438 in the track width direction is preferably larger than the maximum width dimension of the upper core layer 42 in the track width direction in order to improve the quality of the upper core layer 42.

Assuming that the length dimension from the contact portion 438c of the Gd-determining layer 438 in contact with the rear end surface 32a of the protruding layer 32 to the rear end surface 438b of the Gd-determining layer 438 is L6, the length dimension L6 is larger than the thickness dimension T4 of the Gd-determining layer 438. Therefore, in the thin film magnetic head shown in FIG. 24, the length dimension from the corner 438P of the Gd-determining layer 438 to the corner 32Q of the rear end surface 32a of the protruding layer 32 can be increased. Thus, it is difficult for the magnetic flux to flow from the corner 438P to the corner 32Q, and consequently a magnetic field more readily occurs at the surface facing the recording medium. Therefore, in the thin film magnetic head shown in FIG. 24, the recording efficiency can be increased.

In manufacturing the thin film magnetic head shown in FIG. 15, in the step shown in FIG. 13, the Gd-determining layer 138 is formed so that its front end surface 138a is positioned on the protruding layer 32, and its rear end surface 138b is positioned on the coil insulating layer 36. The length dimension L3 is set to be larger than the thickness dimension T1.

In manufacturing the thin film magnetic head shown in FIG. 19, in the step shown in FIG. 13, the Gd-determining layer 238 is formed so that its front end surface 238a is positioned on the protruding layer 32, and its rear end surface 238b is positioned on the back gap layer 33. The length dimension L4 is set to be larger than the thickness dimension T2.

In manufacturing the thin film magnetic head shown in FIG. 23, like the thin film magnetic head shown in FIG. 15, in the step shown in FIG. 13, the Gd-determining layer 338 is formed so that its front end surface 338a is positioned on the protruding layer 32, and its rear end surface 338b is positioned on the coil insulating layer 36. The length dimension L5 is set to be larger than the thickness dimension T3.

The thin film magnetic head shown in FIG. 23 comprises a structure in which the toroidal coil layer 57 is formed. In manufacturing the thin film magnetic head shown in FIG. 23, the first coil segments 55 are formed in the step shown in FIG. 9, and then the connecting portions 61 shown in FIGS. 6 and 7 are formed at the same time as the protruding layer 32 and the back gap layer 33 are formed in the step shown in FIG. 10. Furthermore, the insulating layer 58 and the resist layer 63 are formed on the upper core layer 42 after the step shown in FIG. 14, and then the plurality of second coil segments 56 is formed on the insulating layer 58 so that the ends of the second coil segments 56 are magnetically connected to the respective connecting portions 61 to form the toroidal coil layer 57. In forming the insulating layer 58 on the upper core layer 42 after the step shown in FIG. 14, the stepped portion due to the thickness dimension T3 of the Gd-determining layer 338 occurs on the top 58a of the insulating layer 58. In this case, the second coil segments 56 may be formed on the top 58a of the insulating layer 58 which is not planarized to leave the stepped portion. However, the second coil segments 56 are preferably formed after the top 58a of the insulating layer 58 is planarized to remove the stepped portion. The reason for this is that when the second coil segments 56 are formed on the top of the stepped portion, the second coil segments 56 are curved by the stepped portion, and thus cannot be formed with high precision. Therefore, as shown in FIG. 21, the top 58a of the insulating layer 58 is preferably planarized, and the second coil segments 56 are then formed on the planarized top 58a because the second coil segments 56 can be formed with high precision.

Like in the thin film magnetic head shown in FIG. 16, in the thin film magnetic head shown in FIG. 24, in the step shown in FIG. 13, the Gd-determining layer 438 is formed so that its front end surface 438a is positioned on the protruding layer 32, and its rear end surface 438b is positioned on the back gap layer 33. The length dimension L6 is set to be larger than the thickness dimension T4.

Like the thin film magnetic head shown in FIG. 23, the thin film magnetic head shown in FIG. 24 comprises a structure in which the toroidal coil layer 57 is formed. In manufacturing the thin film magnetic head shown in FIG. 24, the first coil segments 55 are formed in the step shown in FIG. 9, and then the connecting portions 61 shown in FIGS. 6 and 7 are formed at the same time as the protruding layer 32 and the back gap layer 33 are formed in the step shown in FIG. 10. Furthermore, the insulating layer 58 and the resist layer 63 are formed on the upper core layer 42 after the step shown in FIG. 14, and then the plurality of second coil segments 56 is formed on the insulating layer 58 so that the ends of the second coil segments 56 are magnetically connected to the respective connecting portions 61 to form the toroidal coil layer 57. In the process for manufacturing the thin film magnetic head shown in FIG. 24, after the insulating layer 58 is formed on the upper core layer 42 in the step shown in FIG. 14, the second coil segments 56 may be formed on the top 58a of the insulating layer 58 which is not planarized. However, in order to form the second coil segments 56 with high precision, the second coil segments 56 are preferably formed after the top 58a of the insulating layer 58 is planarized to remove the stepped portion.

Each of the above-described thin film magnetic heads of the present invention is built in a magnetic head device mounted on, for example, a hard disk device or the like. The thin film magnetic head may be built-in either a floating-type magnetic head or contact-type magnetic head. The thin film magnetic head can also be used for a magnetic sensor and the like other than the hard disk device.

As described above, in the present invention, a coil layer is formed in a space surrounded by a lower core layer, a protruding layer and a back gap layer, the top of the protruding layer, the top of a coil insulating layer and the top of the back gap layer are planarized to a continuous flat surface, and the three layers including a lower magnetic pole layer, a gap layer and an upper magnetic pole layer are formed on the flat surface.

Since the lower magnetic pole layer, the gap layer and the upper magnetic pole layer are formed on the flat surface, the three layers can be precisely formed in a predetermined shape, and the track width Tw can be easily set to a predetermined dimension by the width dimension of the upper magnetic pole layer at the surface facing a recording medium. Therefore, a thin film magnetic head appropriately adaptable for a higher recording density can be manufactured.

Since the lower magnetic pole layer, the gap layer and the upper magnetic pole layer are formed on the flat surface, the magnetic path can be shortened. Therefore, even when the turn number of a coil is decreased, deterioration in the recording properties can be prevented. It is thus possible to decrease the turn number to decrease the coil resistance, and appropriately suppress the problem of projection due to thermal expansion.

In the thin film magnetic head of the present invention, an organic insulating layer need not be provided, and thus the thermal expansion coefficient can be decreased to appropriately suppress the problem of projection due to thermal expansion.

Also, in the present invention, a Gd-determining layer is provided on the flat surface, and the lower magnetic pole layer and the upper magnetic pole layer are functionally divided into a magnetic pole and a yoke by the Gd-determining layer. Namely, in a region ahead of at least the Gd-determining layer, the lower magnetic pole layer and the upper magnetic pole layer function as the magnetic pole for concentrating a magnetic flux to generate a recording magnetic field for the recording medium, while in a region behind at least the Gd-determining layer, the lower magnetic pole layer and the upper magnetic pole layer function as the yoke for effectively permitting the magnetic flux to flow in a closed magnetic path. In this way, the three layers can be functionally separated by providing the Gd-determining layer, and a thin film magnetic head having excellent recording properties can be manufactured.

Furthermore, in the thin film magnetic head of the present invention, the length dimension from the contact portion of the Gd-determining layer in contact with the rear end surface of the protruding layer to the rear end surface of the Gd-determining layer is set to be larger than the thickness dimension of the Gd-determining layer. Therefore, the length dimension from the corner of the rear end surface of the Gd-determining layer to the corner of the rear end surface of the protruding layer can be increased. This decreases the amount of magnetic flux flowing between both corners, and thus permits a magnetic field to readily occur at the surface facing the recording medium, thereby increasing the recording efficiency.

What is claimed is:

1. A thin film magnetic head comprising:
    a lower core layer extending from a surface facing a recording medium in a height direction;
    a protruding layer extending on the lower core layer for a predetermined length from the surface facing the recording medium in the height direction;
    a back gap layer disposed on the lower core layer separated from a rear end of the protruding layer by a first distance in the height direction;
    a coil layer disposed in a space surrounded by at least the lower core layer, the protruding layer and the back gap layer;
    a coil insulating layer covering the coil layer, tops of the coil insulating layer, the protruding layer and the back gap layer being planarized to a continuous flat surface;
    a Gd-determining layer disposed on the flat surface separated from the surface facing the recording medium by a second distance in the height direction.
    a lower magnetic pole layer and gap layer disposed in that order on the flat surface in each of a region between the surface facing the recording medium and the Gd-determining layer and a region behind the Gd-determining layer in the height direction; and
    an upper magnetic pole layer disposed on the gap layer and the Gd-determining layer;
    wherein the lower magnetic pole layer, the gap layer and the upper magnetic pole layer have a same planar shape, and a track width is determined by a width of the upper magnetic pole layer in a track width direction at the surface facing the recording medium.

2. A thin film magnetic head according to claim 1, wherein the lower magnetic pole layer, the gap layer and the upper magnetic pole layer are formed by plating.

3. A thin film magnetic head according to claim 1, wherein an upper core layer is formed on the upper magnetic pole layer into the same planar shape as that of the upper magnetic pole layer, and the upper magnetic pole layer and lower magnetic pole layer have a higher saturation magnetic flux density than that of the upper core layer.

4. A thin film magnetic head according to claim 3, wherein the upper core layer has a larger thickness than that of the upper magnetic pole layer.

5. A thin film magnetic head according to claim 1, wherein the upper magnetic pole layer and lower magnetic pole layer have a higher saturation magnetic flux density than that of the lower core layer, the protruding layer and the back gap layer.

6. A thin film magnetic head according to claim 1, wherein the upper magnetic pole layer has a planar shape comprising a front end portion which has a width corresponding to the track width at the surface facing the recording medium and which extends in the height direction while the width remains substantially constant or widens, and a rear end portion which widens from a base end of the front end portion in the track width direction so that the width increases in the height direction.

7. A thin film magnetic head according to claim 1, wherein a boundary between a bottom and a front end surface of the Gd-determining layer, which is positioned more proximate to the surface facing the recording medium than a rear end surface of the Gd-determining layer, is positioned on the protruding layer;

the Gd-determining layer is formed on both the protruding layer and the coil insulating layer; and a length from a boundary between the top and rear end surface of the protruding layer in the height direction to the boundary between the bottom and rear end surface of the Gd-determining layer in the height direction is larger than a maximum thickness of the Gd-determining layer.

8. A thin film magnetic head according to claim 7, wherein the boundary between the bottom and rear end surface of the Gd-determining layer is positioned one of on the back gap layer and on a boundary between the top and front end surface of the back gap layer, which is positioned more proximate to the surface facing the recording medium than a rear end surface of the back gap layer, and the Gd-determining layer is disposed between the top of the coil insulating layer and a bottom of the upper magnetic pole layer.

9. A thin film magnetic head according to claim 1, further comprising a first plated underlying layer provided on at least a portion of the flat surface between a rear end surface of the Gd-determining layer and a front end surface of the back gap layer, which is positioned more proximate to the surface facing the recording medium than a back end surface of the back gap layer, the lower magnetic pole layer being formed on the first plated underlying layer by plating.

10. A thin film magnetic head according to claim 9, wherein the first plated underlying layer comprises a non-magnetic metal material.

11. A thin film magnetic head according to claim 9, further comprising a second plated underlying layer formed on the protruding layer and separated from the first plated underlying layer, wherein at least the Gd-determining layer is disposed between the first and second plated underlying layers, the second plated underlying layer comprises a magnetic material, and the lower magnetic pole layer is formed on the second plated underlying layer by plating.

12. A thin film magnetic head according to claim 1, further comprising a third plated underlying layer formed on only a portion of the Gd-determining layer, the upper magnetic pole layer being formed on the third plated underlying layer by plating.

13. A thin film magnetic head according to claim 1, wherein the coil layer is formed on a plane parallel to the surface of the lower core layer so as to be wound around the back gap layer as a center.

14. A thin film magnetic head according to claim 1, wherein the coil layer comprises a plurality of first coil segments formed in parallel to each other in the space surrounded by the lower core layer, the protruding layer and the back gap layer, and a plurality of second coil segments formed in parallel to each other on the upper magnetic pole layer with an insulating layer provided therebetween, the first coil segments being non-parallel to the second coil segments; and an end of each first coil segment and an end of each second coil segment face each other in the thickness direction of the upper magnetic pole layer and are connected to each other through a connecting portion to form a toroidal coil structure.

\* \* \* \* \*